US007049771B2

(12) United States Patent
Katanaya

(10) Patent No.: US 7,049,771 B2
(45) Date of Patent: May 23, 2006

(54) MULTI-PHASE CARRIER SIGNAL GENERATOR AND MULTI-PHASE CARRIER SIGNAL GENERATION METHOD

(75) Inventor: Ikuya Katanaya, Kyoto (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 0 days.

(21) Appl. No.: 11/042,093

(22) Filed: Jan. 26, 2005

(65) Prior Publication Data

US 2005/0163237 A1 Jul. 28, 2005

(30) Foreign Application Priority Data

Jan. 27, 2004 (JP) .......................... P2004-018907
Apr. 30, 2004 (JP) .......................... P2004-136808

(51) Int. Cl.
*H02K 7/06* (2006.01)

(52) U.S. Cl. ...................... 318/254; 318/254; 318/599; 318/603

(58) Field of Classification Search ..................... None
See application file for complete search history.

(56) References Cited

U.S. PATENT DOCUMENTS

| 3,916,285 | A | * | 10/1975 | Iwata et al. .................. 363/41 |
| 4,099,109 | A | * | 7/1978 | Abbondanti ................ 318/811 |
| 4,166,247 | A | * | 8/1979 | Miyazawa .................. 327/176 |
| 4,167,775 | A | * | 9/1979 | Baker et al. .................. 363/42 |
| 4,295,189 | A | * | 10/1981 | Boys .......................... 363/41 |
| 4,325,112 | A | * | 4/1982 | Otsuka ........................ 363/42 |
| 4,339,697 | A | * | 7/1982 | Franz .......................... 388/811 |
| 4,419,615 | A | * | 12/1983 | Muto et al. ................. 318/811 |
| 4,491,768 | A | * | 1/1985 | Slicker ....................... 318/139 |
| 4,562,524 | A | * | 12/1985 | Mutoh et al. ................. 363/41 |
| 4,599,550 | A | * | 7/1986 | Robertson et al. .......... 318/811 |
| 4,622,628 | A | * | 11/1986 | Murasaki et al. ............. 363/37 |
| 4,628,475 | A | * | 12/1986 | Azusawa et al. ........... 708/845 |
| 4,660,162 | A | * | 4/1987 | Berlinsky ................... 708/290 |
| 4,727,468 | A | * | 2/1988 | Maekawa .................... 363/41 |
| 4,802,077 | A | * | 1/1989 | Fujii et al. .................... 363/41 |
| 4,860,186 | A | * | 8/1989 | Maekawa et al. ............. 363/41 |
| 4,894,598 | A | * | 1/1990 | Daggett ................. 318/568.16 |
| 5,177,373 | A | * | 1/1993 | Nakamura .................. 327/176 |
| 5,309,079 | A | * | 5/1994 | Takada ....................... 318/811 |
| 5,350,988 | A | * | 9/1994 | Le ............................. 318/618 |
| 5,382,886 | A | * | 1/1995 | Mizuide ..................... 318/807 |
| 5,400,237 | A | * | 3/1995 | Flanagan et al. ............. 363/41 |

(Continued)

FOREIGN PATENT DOCUMENTS

JP 2002-27763 A 1/2002

(Continued)

*Primary Examiner*—David Martin
*Assistant Examiner*—Robert W. Horn
(74) *Attorney, Agent, or Firm*—Sughrue Mion, PLLC

(57) ABSTRACT

A carrier signal generation section is provided for each of U, V, and W phases, and each of the carrier signal generation sections has an up-down counter for counting clock signals output from a clock generator. An initial value is set for each of the up-down counters. When the up-down counters are simultaneously started by method of a count start signal output from a CPU, the respective up-down counters start counting operations from the respective initial values, perform cumulative subtraction until the count value reaches an upper limit, and perform cumulative addition until the count value reaches a lower limit. As a result, triangular wave carrier signals Cu, Cv and Cw of respective phases having a predetermined phase difference can be readily generated with high accuracy.

15 Claims, 15 Drawing Sheets

U.S. PATENT DOCUMENTS

| | | | |
|---|---|---|---|
| 5,416,686 A * | 5/1995 | Azuma et al. | 363/37 |
| 5,486,743 A * | 1/1996 | Nagai | 318/439 |
| 5,500,627 A * | 3/1996 | Hulsing, II | 331/1 A |
| 5,581,169 A * | 12/1996 | Kerkman et al. | 318/811 |
| 5,646,499 A * | 7/1997 | Doyama et al. | 318/801 |
| 5,650,709 A * | 7/1997 | Rotunda et al. | 318/802 |
| 5,739,650 A * | 4/1998 | Kimura et al. | 318/254 |
| 5,903,128 A * | 5/1999 | Sakakibara et al. | 318/721 |
| 5,933,344 A * | 8/1999 | Mitsuishi et al. | 700/13 |
| 6,055,145 A * | 4/2000 | Lagree et al. | 361/93.1 |
| 6,060,851 A * | 5/2000 | Imai et al. | 318/437 |
| 6,194,856 B1 * | 2/2001 | Kobayashi et al. | 318/432 |
| 6,324,038 B1 * | 11/2001 | Kishibe et al. | 361/31 |
| 6,392,418 B1 * | 5/2002 | Mir et al. | 324/503 |
| 6,400,107 B1 * | 6/2002 | Nakatani et al. | 318/254 |
| 6,418,097 B1 * | 7/2002 | Schell et al. | 369/44.34 |
| 6,426,609 B1 * | 7/2002 | Tanaka et al. | 322/19 |
| 6,448,827 B1 * | 9/2002 | Tojima | 327/172 |
| 6,452,349 B1 * | 9/2002 | Hahn et al. | 318/254 |
| 6,545,443 B1 * | 4/2003 | Kushida | 318/727 |
| 6,549,871 B1 * | 4/2003 | Mir et al. | 702/145 |
| 6,559,783 B1 * | 5/2003 | Stoneking | 341/141 |
| 6,611,117 B1 * | 8/2003 | Hardt | 318/254 |
| 6,792,042 B1 * | 9/2004 | Bae | 375/238 |
| 6,946,753 B1 * | 9/2005 | Kernahan et al. | 307/151 |
| 2002/0057069 A1 * | 5/2002 | Kushida | 318/727 |
| 2005/0025231 A1 * | 2/2005 | Mitsuki | 375/238 |

FOREIGN PATENT DOCUMENTS

JP   2003-164190 A   6/2003

* cited by examiner

FIG. 4

| PHASE DIFFERENCE WITH RESPECT TO REFERENCE CARRIER SIGNAL IN PHASE LAGGING DIRECTION | RATIO OF INITIAL VALUE TO UPPER LIMIT VALUE OF UP/DOWN COUNTER | INITIAL COMMAND VALUE OF FLIP-FLOP |
|---|---|---|
| 60° | 1/3 | L |
| 72° | 2/5 | L |
| 90° | 1/2 | L |
| 120° | 2/3 | L |
| 144° | 4/5 | L |
| 180° | 1 | L |
| 216° | 4/5 | H |
| 240° | 2/3 | H |
| 270° | 1/2 | H |
| 288° | 2/5 | H |
| 300° | 1/3 | H |
| 360° (0°) | 0 | H |

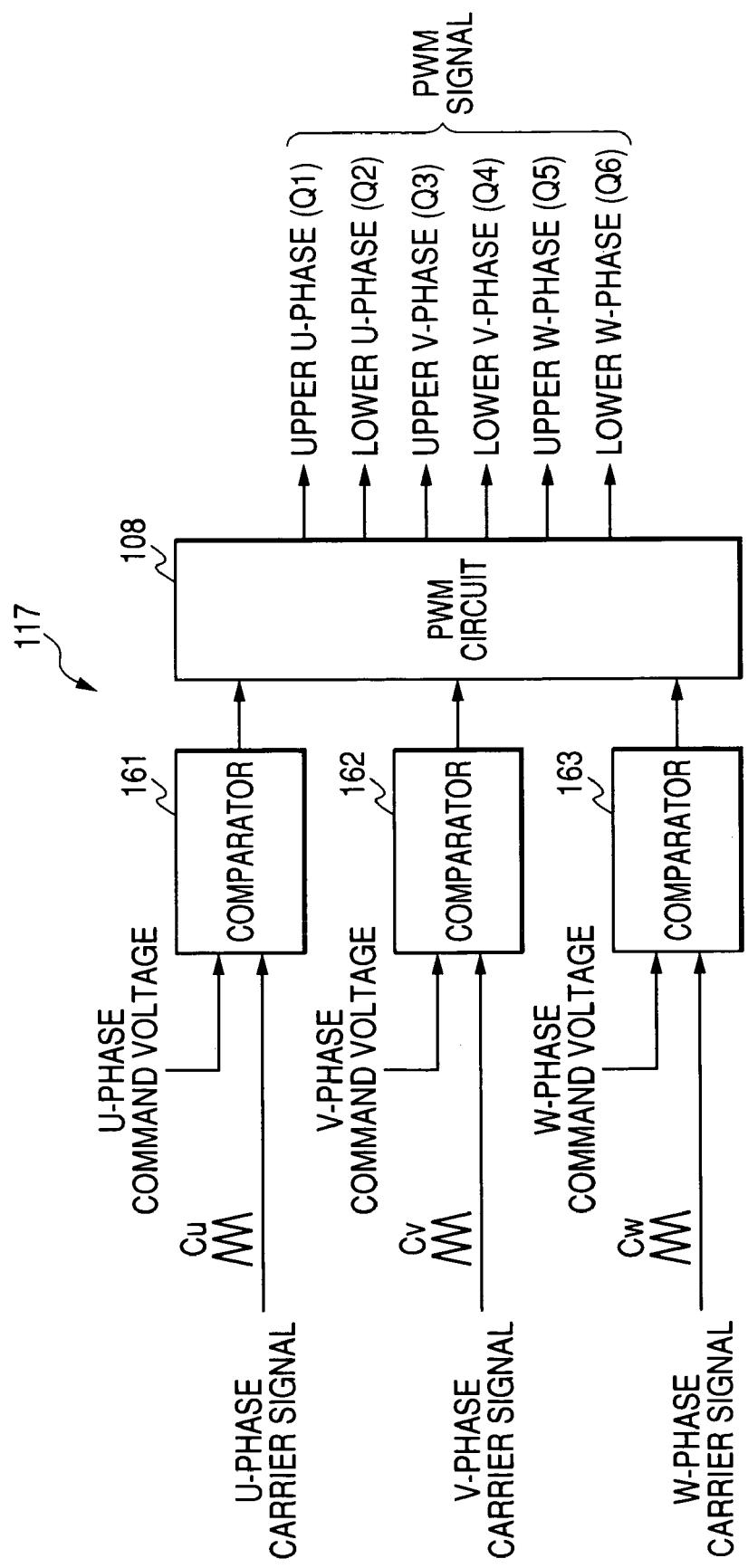

FIG. 18

| UNIT PERIOD | (1) | (2) | (3) | (4) | (5) | (6) |
|---|---|---|---|---|---|---|
| OUTPUT FROM FIRST SELECTOR (U-PHASE CARRIER SIGNAL Cu) | X+0 / a | X+α / b | X+2α / c | 3α-X / d | 2α-X / e | α-X / f |
| OUTPUT FROM SECOND SELECTOR (V-PHASE CARRIER SIGNAL Cv) | 2α-X / e | α-X / f | X+0 / a | X+α / b | X+2α / c | 3α-X / d |
| OUTPUT FROM THIRD SELECTOR (W-PHASE CARRIER SIGNAL Cw) | X+2α / c | 3α-X / d | 2α-X / e | α-X / f | X+0 / a | X+α / b |

MULTI-PHASE CARRIER SIGNAL GENERATOR AND MULTI-PHASE CARRIER SIGNAL GENERATION METHOD

BACKGROUND OF THE INVENTION

1. Field of the Invention

The present invention relates to a multi-phase carrier signal generator and a multi-phase carrier signal generation method, both being used for controlling PWM (Pulse Width Modulation) of a three-phase AC motor.

2. Description of the Related Art

FIG. 6 shows a controller of a common three-phase AC motor operating under PWM control. In the drawing, reference symbol B denotes a battery, and power is supplied from this battery B to a motor M by way of a contactor Z and an inverter circuit 100. For instance, the motor M is a three-phase induction motor mounted on a forklift. The contactor Z is formed from a contact point of a magnetic contactor. In the drawing, reference symbol C denotes a capacitor connected between power lines, and ST denotes a shunt for detecting an electric current flowing into the motor M. The shunt ST is formed from a resistor. Reference symbol PG denotes a pulse generator for detecting the revolutions per minute (RPM) of the motor M, and the pulse generator is formed from a known rotary encoder provided on a rotary shaft of the motor M.

The inverter circuit 100 is a circuit for driving the motor M by converting DC power of the battery B into AC power and corresponds to a known circuit constituted of six semiconductor switching elements; namely, an upper U-phase switching element Q1, a lower U-phase switching element Q2, an upper V-phase switching element Q3, a lower V-phase switching element Q4, an upper W-phase switching element Q5, and a lower W-phase switching element Q6. An element capable of operating at high speed; e.g., a MOS FET (field-effect transistor) or an IGBT (insulated gate bipolar transistor), is used as the semiconductor switching element. A PWM signal output from a control section 101 is input to gates of the respective semiconductor switching elements Q1 to Q6. The respective semiconductor switching elements Q1 to Q6 are opened and closed during predetermined ON periods and predetermined OFF periods by this PWM signal. Consequently, an output from the inverter circuit 100 is taken out as a three-phase AC voltage, and a U-phase voltage, a V-phase voltage, and a W-phase voltage are supplied to the motor M.

The control section 101 has a CPU, memory, an A/D converter, a carrier signal generation circuit, and a PWM circuit. For example, a command value, such as a motor speed based on actuation of a lever of a forklift, a pulse output from the pulse generator PG, a current value detected by the shunt ST, or a voltage value of the battery B, is input to the control section 101. On the basis of the input values, the control section 101 generates a PWM signal required to control the motor M and outputs the signal to the inverter circuit 100. The motor controller using PWM control is described in, e.g., JP-A-2003-164190.

FIG. 7 is a view showing the configuration of a PWM signal generation section provided in the control section 101. Reference numeral 200 designates a carrier signal generation section for generating a carrier signal Ca; 207 designates a comparator for comparing the carrier signal Ca with the value of the U-phase command; 208 designates a comparator for comparing the carrier signal Ca with the value of a V-phase command; 209 designates a comparator for comparing the carrier signal Ca with the value of the W-phase command; and 210 designates a PWM circuit for generating a PWM signal on the basis of outputs from the comparators 207 to 209. Pulses imparted to the respective gates of the upper U-phase switching element Q1, the lower U-phase switching element Q2, the upper V-phase switching element Q3, the lower V-phase switching element Q4, the upper W-phase switching element Q5, and the lower W-phase switching element Q6 in the inverter circuit 100 shown in FIG. 6 are output as PWM signals from the PWM circuit 210.

FIG. 8 is a view for describing the principle for generating a PWM signal. As illustrated, the carrier signal Ca is a triangular wave having a given frequency, and the command values of respective phases are compared with the amplitude of the carrier signal Ca signal by the comparators 207 to 209. During a period in which the amplitude of the carrier signal Ca is greater than or equal to the command voltage, outputs from the comparators 207 to 209 become "H". During a period in which the amplitude of the carrier signal Ca is less than the command voltage, outputs from the comparators 207 to 209 become "L". Therefore, signals whose pulse widths vary in accordance with a change in the command voltage are obtained from the comparators 207 to 209. The signals are input to the PWM circuit 210, and the PWM circuit 210 generates six types of PWM signals, on the basis of the output from the comparators 207 to 209, for activating the upper and lower switching elements Q1 to Q6 of respective phases, such as those shown in FIG. 8. As can be seen from FIG. 8, during a period in which the amplitude of the carrier signal Ca is greater then or equal to the command voltages of respective phases, the upper switching elements of respective phases are activated, whilst the lower switching elements are deactivated. In contrast, during a period in which the amplitude of the carrier signal Ca is less than the command voltages, the lower switching elements of respective phases are activated, whereas the upper switching elements are deactivated.

Here, when the timing at which one of the pair of upper and lower switching elements of each phase is activated coincides with the timing at which the remaining element of is deactivated, a short circuit is formed from the upper and lower switching elements, whereupon a heavy current flows through the circuit, which may in turn destroy the element. For this reason, in reality, the PWM circuit 210 performs processing for producing a given time difference (dead time) between the activation timing of one of the pair of upper and lower switching elements and the deactivation timing of the other element.

However, in the case of such a method for generating a PWM signal through use of a single carrier signal Ca, when the motor voltage is in the neighborhood of 0 volt; that is, when a duty ratio between the pulses of PWM signals of respective phases is in the vicinity of 50:50, the periods of the dead times Td of respective phases overlap each other in the same position. During these periods, the inverter circuit 100 becomes inoperative, thereby raising a problem of a failure to output the motor voltage to be output.

As shown in FIG. 10, in order to solve this problem, the following method is proposed in JP-A-2002-27763 to be described later. Under this method, independent carrier signals are used for the respective U-phase, V-phase, and W-phase, and command voltages of respective phases are compared with carrier signals of corresponding phases while the phases between the carrier signals are made different from each other by 120°, to thus obtain a PWM signal. As shown in FIG. 11, even when the pulse duty ratio between the PWM signals of respective phases is in the neighborhood of 50:50, the periods of the dead times Td of respective phases do not overlap each other in accordance with a difference between the phases of the carrier signals. Even when the motor voltage is in the neighborhood of 0 volt, the inverter circuit 100 operates to thus produce a predetermined voltage.

SUMMARY OF THE INVENTION

JP-A-2002-27763 provides no disclosure about a specific circuit for generating an independent carrier signal for each phase. Hence, the method of generating such a carrier signal becomes a problem. For instance, the configuration of a carrier signal generation section 300 shown in FIG. 12 is conceived as an example carrier signal generation method. In FIG. 12, reference numeral 301 designates a pulse generator for generating a rectangular pulse; 302 designates a phase shifter for shifting the pulse generated by the pulse generator 301 through 120°; and 303 designates a phase shifter for additionally shifting through 120° the pulse having already been shifted through 120° by the phase shifter 302. Reference numeral 304 designates an integrator circuit for generating a U-phase carrier signal Cu formed from a triangular wave by integrating the pulse generated by the pulse generator 301; 305 designates an integrator circuit for generating a V-phase carrier signal Cv formed from a triangular wave by integrating the pulse shifted through 120° by the phase shifter 302; and 306 designates an integrator circuit for generating a W-phase carrier signal Cw formed from a triangular wave by integrating the pulse shifted through 120° by the phase shifter 303. Reference numeral 307 designates a comparator for comparing the U-phase carrier signal Cu with the U-phase command voltage; 308 designates a comparator for comparing the V-phase carrier signal Cv with the V-phase command voltage; and 309 designates a comparator for comparing the W-phase carrier signal Cw with the W-phase command voltage. Outputs from the comparators 307 to 309 are imparted to the unillustrated PWM circuit.

According to the circuit shown in FIG. 12, the pulses generated by the pulse generator 301 are caused to pass through the phase shifters 302, 303, and the pulses are integrated by the integrator circuits 304 to 306, thereby producing the U-phase carrier signal Cu, the V-phase carrier signal Cv, and the W-phase carrier signal Cw, each being shifted by 120°. However, the configuration of the carrier signal generation section 300, such as that shown in FIG. 12, requires a necessity for performing complicated waveform processing through use of a phase-shifter and an integration circuit. Thus, the configuration encounters difficulty in achieving high accuracy of waveform of the carrier signal and high accuracy of a phase difference.

The present invention aims to solve the problem and provides a multi-phase carrier signal generator and a multi-phase carrier signal generation method, which enable highly-accurate acquisition of triangular wave carrier signals of respective phases with simple means.

According to an embodiment of the present invention, there is provided a multi-phase carrier signal generator for generating multi-phase triangular wave carrier signals including: a clock generation method which generates a clock signal of predetermined frequency; and carrier signal generation sections for respective phases, each section generating a single triangular wave carrier signal, wherein each of the carrier signal generation sections includes: a counting method which counts the number of clock signals generated by the clock generation method and subjects a count value to cumulative addition or cumulative subtraction, to thus output a triangular wave carrier signal; a first detection method which detects that a count value of the counting method has reached a predetermined upper limit value; a second detection method which detects that a count value of the counting method has reached a predetermined lower limit value; and a command method which issues to the counting method a subtraction command for effecting the cumulative subtraction on the basis of a detection output from the first detection method and which issues to the counting method an addition command for effecting cumulative addition on the basis of a detection output from the second detection method; and the counting method of one phase outputs a triangular wave carrier signal having a predetermined phase difference from a triangular wave carrier signal output from the counting method of another phase.

As mentioned above, the carrier signal generation section is for generating multi-phase carrier signals whose phases are out of phase with each other. Each of the carrier signal generation sections is provided with a counting method, and the counting method performs counting operation on the basis of a clock signal. When the count value has reached an upper limit, cumulative subtraction is performed. When the count value has reached a lower limit, cumulative addition is performed. As a result, a multi-phase carrier signal formed from a triangular wave is generated readily. For this reason, a triangular wave carrier signal having an accurate waveform and a phase difference, both corresponding to a count value, can be obtained without involvement of complicated waveform processing, by means of performing only digital addition and subtraction through use of an up-down counter or the like.

In the embodiment of the present invention, although the upper limit value detected by the first detection method is set to the same value for all phases, the upper limit value may vary from one phase to another. In the embodiment of the present invention, although the lower limit value detected by the first detection method is set to the same value for all phases, the lower limit value may vary from one phase to another.

In the embodiment, an initial value corresponding to the phase difference is set for each counting method of the respective carrier signal generation sections, and the counting method cumulatively adds a count value to the initial value or cumulatively subtracts a count value from the initial value. In this case, a phase difference among the carrier signals output from the respective counting methods can be set arbitrarily by appropriately selecting the initial values of the respective counting methods. Consequently, triangular wave carrier signals, which are required for performing PWM control of a three-phase motor and are out of phase with each other by 120°, can be obtained readily and with high accuracy. The upper limit value detected by the first detection method and the lower limit value detected by the second detection method are set to the same values for all phases, thereby enabling setting of an arbitrary phase difference by selecting only initial values.

In the embodiment of the present invention, after having issued an initial subtraction or addition command to the counting method, the command method issues the subtraction command to the counting method on the basis of a detection output from the first detection method and issues an addition command to the counting method on the basis of a detection output from the second detection method.

In the embodiment of the present invention, a triangular wave carrier signal generated by one of the carrier signal generation sections is taken as a reference triangular wave carrier signal. In the carrier signal generation section which generates a triangular wave carrier signal whose phase difference from the reference triangular wave carrier signal falls within the range of 0° to 180° in a phase lagging direction, the command method issues to the counting method an initial command differing from that issued by the command method of the carrier signal generation section that generates a reference triangular wave. In contrast, in the carrier signal generation section which generates a triangular wave carrier signal whose phase difference from the reference triangular wave carrier signal falls within the range of 180° to 360° in a phase lagging direction, the command method issues to the counting method an initial command identical with that issued by the command method of the carrier signal generation section that generates a reference triangular wave.

In the embodiment of the present invention, there may be provided a control method for controlling operations of the respective carrier signal generation sections. This control method is arranged to simultaneously issue to the respective counting methods a count start signal for starting counting of the number of the clock signals, and the respective counting methods simultaneously start counting operations upon receipt of the count start signal. As a result, no offset arises in timings at which counting operation is started in respective phases, thereby enhancing the accuracy of a phase difference among the carrier signals of respective phases.

In the embodiment of the present invention, at least one of the carrier signal generation sections outputs a detection output from the first detection method as a first interrupt signal for a peak of the triangular wave carrier signal and outputs a detection output from the second detection method as a second interrupt signal for a valley of the triangular wave carrier signal. Thus, so long as the detection signal pertaining to the upper or lower limit of the count value is utilized as an interrupt signal, an interruption can be made in the peak and the valley of the triangular wave carrier signal. At the timings corresponding to the peak and the valley, the pulse of the PWM signal does not ascend or descend and remains in a stable ON or OFF state. Therefore, various types of control operations; e.g., analog-to-digital conversion of a motor current or fault diagnosis of an element of an inverter circuit, can be stably performed by utilization of this interrupt signal.

According to an embodiment of the present invention, there is provided a multi-phase carrier signal generation method for generating multi-phase triangular wave carrier signals on the basis of counting of a clock signal of predetermined frequency, the method including steps of: cumulatively adding a count value for each phase until a clock count value reaches a predetermined upper limit value; cumulatively subtracting a count value until the count value reaches a predetermined lower limit value when the clock count value has reached the predetermined upper limit value; cumulatively adding the count value again when the clock count value has reached the predetermined lower limit value. As a result of repetition of such cumulative addition and subtraction operations, a triangular wave carrier signal having a predetermined phase difference from a triangular wave carrier signal of another phase is output.

As mentioned above, when the count value has reached an upper limit as a result of the clock signal being counted for each phase, cumulative subtraction is performed. When the count value has reached a lower limit value, cumulative addition is performed, whereby a multi-phase carrier signal formed from a triangular wave signal is readily generated. Therefore, a triangular wave carrier signal having an accurate waveform and a phase difference, both corresponding to the count value, can be obtained without involvement of complicated waveform processing, by means of performing digital addition and subtraction through use of the up-down counter.

In the embodiment of the present invention, although the upper limit value detected by the first detection method is set to the same value for all phases, the upper limit value may vary from one phase to another. In the embodiment of the present invention, although the lower limit value detected by the first detection method is set to the same value for all phases, the lower limit value may vary from one phase to another.

In the embodiment, cumulative addition or subtraction is performed on the basis of the predetermined initial value set according to the phase difference. In this case, a difference among phases of the carrier signals of respective phases can be set arbitrarily by appropriately selecting the initial values. Consequently, triangular wave carrier signals, which are required for performing PWM control of a three-phase motor and are out of phase with each other by 120°, can be obtained readily and with high accuracy. The upper limit value detected by the first detection method and the lower limit value detected by the second detection method are set to the same value for all phases, thereby enabling setting of an arbitrary phase difference by selecting only initial values.

In the embodiment of the present invention, a triangular wave carrier signal having one phase among the phases is taken as a reference triangular wave carrier signal. When the reference triangular wave carrier signal is generated by performing cumulative addition from a predetermined initial value, a triangular wave carrier signal whose phase difference with respect to the reference triangular wave carrier signal falls within the range of 0° to 180° in a phase lagging direction is generated by performing cumulative subtraction operation from the initial value of the corresponding phase. In contrast, when a triangular wave carrier signal is generated by performing cumulative addition from a different predetermined initial value, a triangular wave carrier signal whose phase difference with respect to the reference triangular wave carrier signal falls within the range of 180° to 360° in a phase lagging direction is generated by means of performing cumulative addition operation from the initial value of the corresponding phase. In this case, the reference triangular wave carrier signal evolves from the valley (lower limit value).

In the embodiment of the present invention, a triangular wave carrier signal having one phase among the phases is taken as a reference triangular wave carrier signal. When the reference triangular wave carrier signal is generated by performing cumulative subtraction from a predetermined initial value, a triangular wave carrier signal whose phase difference with respect to the reference triangular wave carrier signal falls within the range of 0° to 180° in a phase lagging direction is generated by performing cumulative addition operation from the initial value of the corresponding phase. In contrast, when a triangular wave carrier signal is generated by performing cumulative subtraction from a different predetermined initial value, a triangular wave carrier signal whose phase difference with respect to the reference triangular wave carrier signal falls within the range of 180° to 360° in a phase lagging direction is generated by means of performing cumulative subtraction operation from the initial value of the corresponding phase. In this case, the reference triangular wave carrier signal evolves from the peak (upper limit value).

In the embodiment of the present invention, counting of clock signals for respective phases is commenced simultaneously. As a result, a difference between the timings at which counting operations for respective phases are commenced is eliminated, thereby enhancing the accuracy of a phase difference between carrier signals of respective phases.

According to the present invention, triangular wave carrier signals having a phase shift are generated by cumulative addition and subtraction of clock count values for respective phases. Hence, a necessity for complicated waveform processing, such as that required when a phase shifter or an integrator circuit is used, is obviated. There is yielded an advantage of the ability to obtain multi-phase carrier signals, each having an accurate waveform and an accurate phase difference, by means of only a simple arithmetic operation.

BRIEF DESCRIPTION OF THE DRAWING

These and other objects and advantages of this invention will become more fully apparent from the following detailed description taken with the accompanying drawings in which:

FIG. 4 is a table for describing setting of initial values of an up/down counter;

FIG. 15 is a block diagram showing details pertaining to an area of a comparator and a PWM circuit;

FIG. 18 is a table for describing operation of a selector.

DETAILED DESCRIPTION OF THE PREFERRED EMBODIMENTS

First Embodiment

Figure 1:
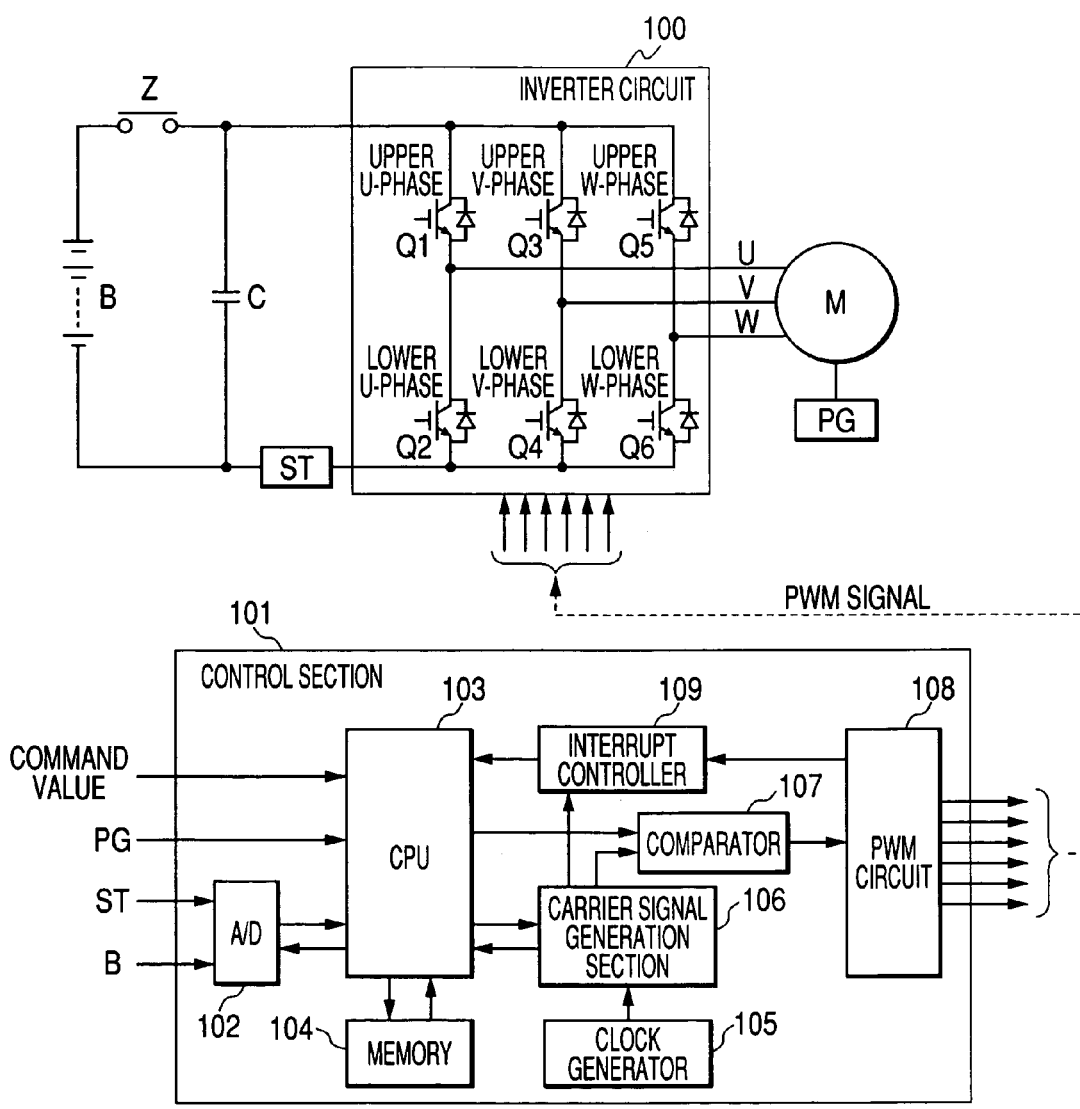
FIG. 1 is a block diagram of a motor controller using a multi-phase carrier signal generator according to a first embodiment of the present invention.

FIG. 1 shows an example of a controller of a three-phase AC motor equipped with a multi-phase carrier signal generator according to a first embodiment of the present invention. Reference symbol B denotes a battery, and power is supplied from this battery B to a motor M by way of a contactor Z and an inverter circuit 100. For instance, the motor M is a three-phase induction motor mounted on a forklift. The contactor Z is formed from a contact point of a magnetic contactor. Reference symbol C denotes a capacitor connected between power lines, and ST denotes a shunt for detecting an electric current flowing into the motor M. The shunt ST is formed from a resistor. Reference symbol PG denotes a pulse generator for detecting the revolutions per minute (RPM) of the motor M, and the pulse generator is formed from a known rotary encoder provided on a rotary shaft of the motor M.

The inverter circuit 100 is a circuit for driving the motor M by converting DC power of the battery B into AC power and corresponds to a known circuit constituted of six semiconductor switching elements; namely, an upper U-phase switching element Q1, a lower U-phase switching element Q2, an upper V-phase switching element Q3, a lower V-phase switching element Q4, an upper W-phase switching element Q5, and a lower W-phase switching element Q6. An element capable of operating at high speed; e.g., a MOS FET (field-effect transistor) or an IGBT (insulated gate bipolar transistor), is used as the semiconductor switching element. A PWM signal output from a control section 101 is input to gates of the respective semiconductor switching elements Q1 to Q6. The respective semiconductor switching elements Q1 to Q6 are opened and closed during predetermined ON periods and predetermined OFF periods by the PWM signal. Consequently, an output from the inverter circuit 100 is taken out as a three-phase AC voltage, and a U-phase voltage, a V-phase voltage, and a W-phase voltage are supplied to the motor M. The foregoing configuration is the same as that shown in FIG. 6.

The control section 101 is equipped with an analog-to-digital converter 102, a CPU 103, memory 104, a clock generator 105, a carrier signal generation section 106, a comparator 107, a PWM circuit 108, and an interrupt controller 109. The multi-phase carrier signal generator of the first embodiment of the present invention is formed from the CPU 103, the memory 104, the clock generator 105, and the carrier signal generation section 106.

For example, a command value, such as a motor speed based on actuation of a lever of a forklift, a pulse output from the pulse generator PG, a current value detected by the shunt ST, or a voltage value of the battery B, is input to the CPU 103. The current value of the shunt ST and the voltage value of the battery B are input to the CPU 103 after having been converted into digital values by the analog-to-digital converter 102. On the basis of the input values, the CPU 103 performs processing required to control the motor M. The memory 104 is formed from RAM and ROM, and the CPU 103 reads various information items required to perform processing from the memory 104 and writes information into the memory 104.

The clock generator 105 generates a predetermined clock signal with a built-in oscillation circuit and outputs the thus-generated clock signal to the carrier signal generation section 106. The clock generator 105 starts operating simultaneously with power-on without receiving a signal from the CPU 103. By means of counting the number of clock signals input from the clock generator 105, the carrier signal generation section 106 generates a triangular carrier signal for each phase. This carrier signal generation section 106 is constituted of three carrier signal generation sections shown in FIG. 2; that is, a U-phase carrier signal generation section 10, a V-phase carrier signal generation section 20, and a W-phase carrier signal generation section 30. The comparator 107 compares command voltages of respective phases imparted by the CPU 103 with the triangular carrier signals of respective phases output from the carrier signal generation section 106, thereby outputting a comparison result as a pulse. This comparator 107 is constituted of three comparators of respective phases 16, 26, and 36 shown in FIG. 2.

On the basis of an output from the comparator 107, the PWM circuit 108 outputs as PWM signals six types of pulses having "H" and "L" periods corresponding to changes in the command voltages of respective phases. The PWM signals are imparted to the gate of the upper U-phase switching element Q1, the gate of the lower U-phase switching element Q2, the gate of the upper V-phase switching element Q3, the gate of the lower V-phase switching element Q4, the gate of the upper W-phase switching element Q5, and the gate of the lower W-phase switching element Q6 in the inverter circuit 100. The switching elements Q1 to Q6 are activated and deactivated by means of the PWM signal, whereby the voltages of U-phase, V-phase and W-phase are output from the inverter circuit 100 and applied to the motor M.

The interrupt controller 109 receives an interrupt signal which is generated between a peak and a valley of the triangular wave carrier signal by the carrier signal generation section 106 and generates an interrupt to the CPU 103. An interrupt signal output from the PWM circuit 108 is input to the interrupt controller 109, as well. This interrupt signal is generated at, e.g., a timing of a leading edge of the PWM signal.

Figure 2:
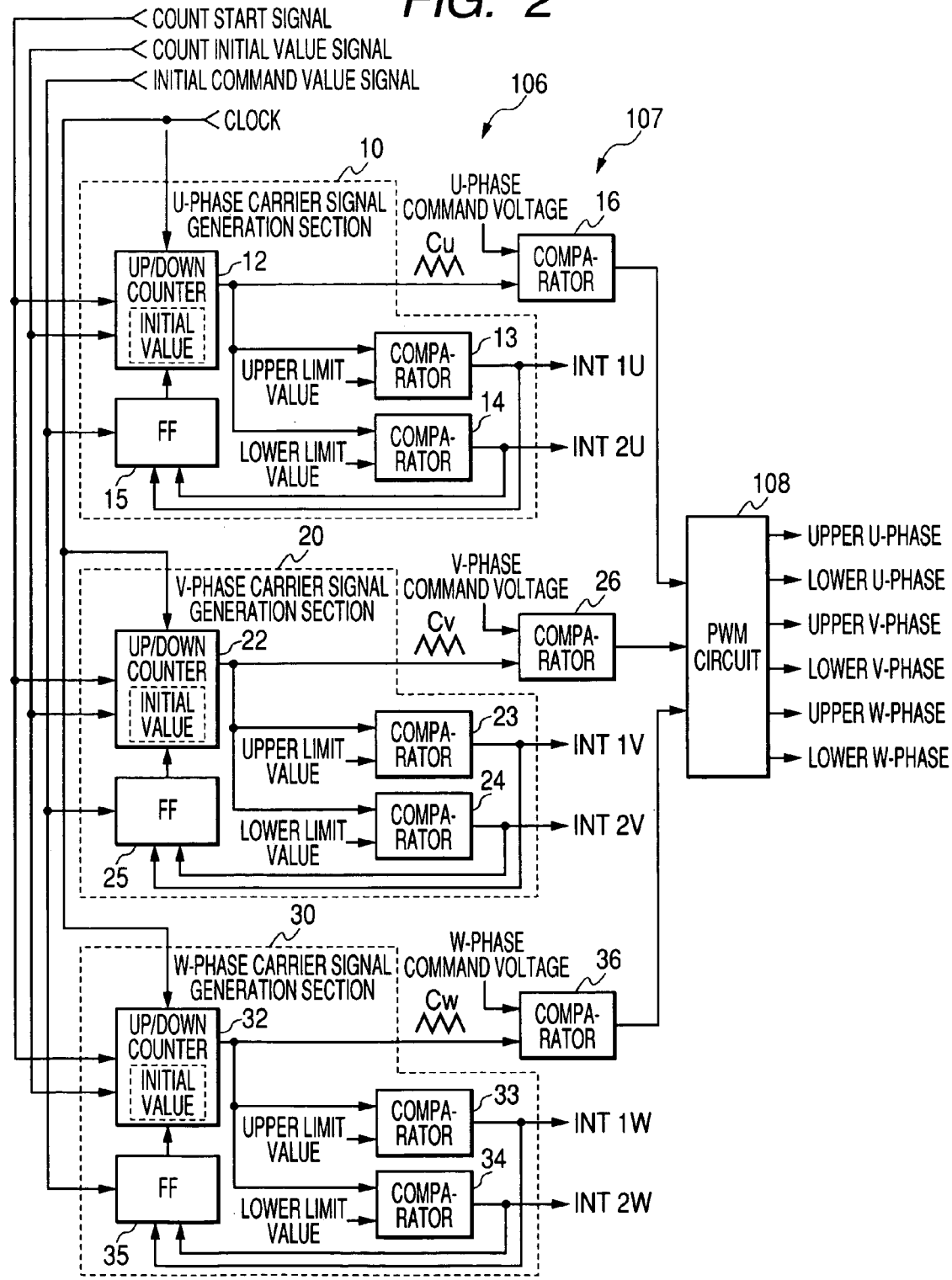
FIG. 2 is a block diagram showing the principal characteristic section of the multi-phase carrier signal generator according to the first embodiment of the present invention.

FIG. 2 is a detailed block diagram of the carrier signal generation section 106 and the comparator 107, both being shown in FIG. 1. As mentioned previously, the carrier signal generation section 106 is constituted of the U-phase carrier signal generation section 10, the V-phase carrier signal generation section 20, and the W-phase carrier signal generation section 30. The U-phase carrier signal generation section 10 generates an U-phase carrier signal Cu which is a standard triangular wave carrier signal. The V-phase carrier signal generation section 20 generates a V-phase carrier signal Cv shifted from the U-phase carrier signal Cu by 120°. The W-phase carrier signal generation section 30 generates a W-phase carrier signal Cw further shifted from the V-phase carrier signal Cv by 120°. A method for generating the carrier signals of respective phases will be described in detail later.

The comparator 107 is constituted of the comparators 16, 26 and 36 provided for the respective phases. The comparator 16 compares the value of the U-phase command voltage output from the CPU 103 with the amplitude of the U-phase carrier signal Cu, outputs an "H" signal during a period in which the amplitude of the U-phase carrier signal Cu is greater than or equal to the U-phase command voltage, and outputs an "L" signal during a period in which the amplitude of the U-phase carrier signal Cu is less than the U-phase command voltage. The comparator 26 compares the value of the V-phase command voltage output from the CPU 103 with the amplitude of the V-phase carrier signal Cv, outputs an "H" signal during a period in which the amplitude of the V-phase carrier signal Cv is greater than or equal to the V-phase command voltage, and outputs an "L" signal during a period in which the amplitude of the V-phase carrier signal Cv is less than the V-phase command voltage. The comparator 36 compares the value of the W-phase command voltage output from the CPU 103 with the amplitude of the W-phase carrier signal Cw, outputs an "H" signal during a period in which the amplitude of the W-phase carrier signal Cw is greater than or equal to the W-phase command voltage, and outputs an "L" signal during a period in which the amplitude of the W-phase carrier signal Cw is less than the W-phase command voltage.

In the U-phase carrier signal generation section 10, reference numeral 12 designates an up-down counter, and the clock signal output from the clock generator 105 shown in FIG. 1 and a count start signal and a count initial value signal, both being delivered from the CPU 103, are input to the up/down counter 12. Upon receipt of the count start signal from the CPU 103, the up/down counter 12 starts counting the number of clock signals, and outputs the U-phase carrier signal Cu, which is a triangular carrier signal, by means of cumulative addition of a count value (addition of one every time a clock signal is input) or cumulative subtraction of the same (subtraction of one every time a clock signal is input). An initial value for counting is set in the up/down counter 12, and the initial value is set by means of the count initial value signal output from the CPU 103. Reference numeral 13 designates a comparator, and this comparator compares the count value of the up/down counter 12 with the predetermined upper limit value to thus detect that an upper limit value is attained by the count value, and outputs a detection signal. Reference numeral 14 also designates a comparator, and this comparator compares the count value of the up/down counter 12 with the predetermined lower limit value to thus detect that a lower limit value is attained by the count value, and outputs a detection signal. Reference numeral 15 designates a flip-flop. The flip-flop outputs an "L" signal to the up-down counter 12 in response to an output from the comparator 13 and outputs an "H" signal to the up-down counter 12 in response to an output from the comparator 14. Upon receipt an "H" signal from the flip-flop 15, the up-down counter 12 subjects the clock count value to cumulative addition. Upon receipt of an "L" signal from the flip-flop 15, the up-down counter 12 subjects the clock count value to cumulative subtraction. Therefore, the "H" signal output from the flip-flop 15 is an addition command for effecting cumulative addition, and the "L" signal output from the same is a subtraction command for effecting cumulative subtraction. An initial command value signal output from the CPU 103 is issued to the flip-flop 15. The initial state of the flip-flop 15; i.e., "H" or "L," is set by the initial command value signal.

In the V-phase carrier signal generation section 20, reference numeral 22 designates an up-down counter. The clock signal output from the clock generator 105 shown in FIG. 1 and a count start signal and a count initial value signal, both being delivered from the CPU 103, are input to the up-down counter 22. Upon receipt of the count start signal from the CPU 103, the up-down counter 22 starts counting the number of clock signals and outputs the V-phase carrier signal Cv, which is a triangular wave carrier signal, by means of cumulative addition or subtraction of the count value. An initial value for counting is set in the up-down counter 22, and this initial value is set by the count initial value signal output from the CPU 103. Reference numeral 23 designates a comparator, and this comparator 23 compares the count value of the up-down counter 22 with a predetermined upper limit value and outputs a detection signal upon detection of the count value having reached the upper limit value. Reference numeral 24 also designates a comparator, and the comparator 24 compares the count value of the up-down counter 22 with a predetermined lower limit value and outputs a detection signal upon detection of the count value having reached the lower limit value. Reference numeral 25 designates a flip-flop, and the flip-flop 25 outputs an "L" signal to the up-down counter 22 in response to an output from the comparator 23 and outputs an "H" signal to the up-down counter 22 in response to an output from the comparator 24. Upon receipt of an "H" signal from the flip-flop 25, the up-down counter 22 subjects the clock count value to cumulative addition. Upon receipt of an "L" signal from the flip-flop 25, the up-down counter 22 subjects the clock count value to cumulative subtraction. Consequently, the "H" signal output from the flip-flop 25 is an addition command for effecting cumulative addition, and the "L" signal output from the flip-flop 25 is a subtraction command for effecting cumulative subtraction. The flip-flop 25 is provided with an initial command value signal from the CPU 103. The initial state of the flip-flop 25; i.e., "H" or "L", is set by the initial command value signal.

In the W-phase carrier signal generation section 30, reference numeral 32 designates an up-down counter. The clock signal output from the clock generator 105 shown in FIG. 1 and a count start signal and a count initial value signal, both being delivered from the CPU 103, are input to the up-down counter 32. Upon receipt of the count start signal from the CPU 103, the up-down counter 32 starts counting the number of clock signals and outputs the W-phase carrier signal Cw, which is a triangular wave carrier signal, by means of cumulative addition or subtraction of the count value. An initial value for counting is set in the up-down counter 32, and this initial value is set by the count initial value signal output from the CPU 103. Reference numeral 33 designates a comparator, and this comparator 33 compares the count value of the up-down counter 32 with a predetermined upper limit value and outputs a detection signal upon detection of the count value having reached the upper limit value. Reference numeral 34 also designates a comparator, and the comparator 34 compares the count value of the up-down counter 32 with a predetermined lower limit value and outputs a detection signal upon detection of the count value having reached the lower limit value. Reference numeral 35 designates a flip-flop, and the flip-flop 35 outputs an "L" signal to the up-down counter 32 in response to an output from the comparator 33 and outputs an "H" signal to the up-down counter 32 in response to an output from the comparator 34. Upon receipt of an "H" signal from the flip-flop 35, the up-down counter 32 subjects the clock count value to cumulative addition. Upon receipt of an "L" signal from the flip-flop 35, the up-down counter 32 subjects the clock count value to cumulative subtraction. Consequently, the "H" signal output from the flip-flop 35 is an addition command for effecting cumulative addition, and the "L" signal output from the flip-flop 35 is a subtraction command for effecting cumulative subtraction. The flip-flop 35 is provided with an initial command value signal from the CPU 103. The initial state of the flip-flop 35; i.e., "H" or "L", is set by the initial command value signal.

The up-down counters 12, 22 and 32 of respective phases are simultaneously issued the previously-described count start signals. The respective up-down counters concurrently start counting operations from respective initial values upon receipt of the count start signals. The detection signals output from the comparators 13, 23 and 33 of respective phases; that is, the signals each indicating that the count value has reached the upper limit value, are delivered to the flip-flops 15, 25 and 35, as well as being coincidentally output as interrupt signals INT1U, INT1V and INT1W. As will be described later, the interrupt signals become peak interrupt signals in the peaks of the triangular wave carrier signals of respective phases. Moreover, the detection signals output from the comparators 14, 24 and 34 of respective phases; that is, the signals each indicating that the count value has reached the lower limit value, are delivered to the flip-flops 15, 25 and 35, as well as being coincidentally output as interrupt signals INT2U, INT2V and INT2W. As will be described later, the interrupt signals become valley interrupt signals in the valleys of the triangular wave carrier signals of respective phases. Although the carrier signal generation sections 10, 20 and 30 are herein arranged to output the interrupt signals, the carrier signal generation section of any one phase or carrier signal generation sections of any two phases may output interrupt signals.

In the above-described carrier signal generator, the clock generator 105 corresponds to the clock generation method of the present invention; the up-down counters 12, 22 and 32 correspond to the counting method of the present invention; the comparators 13, 23 and 33 correspond to the first detection method of the present invention; the comparators 14, 24 and 34 correspond to the second detection method of the present invention; and the flip-flops 15, 25 and 35 correspond to the command method of the present invention. The CPU 103 corresponds to the control method of the present invention.

Figure 3A:
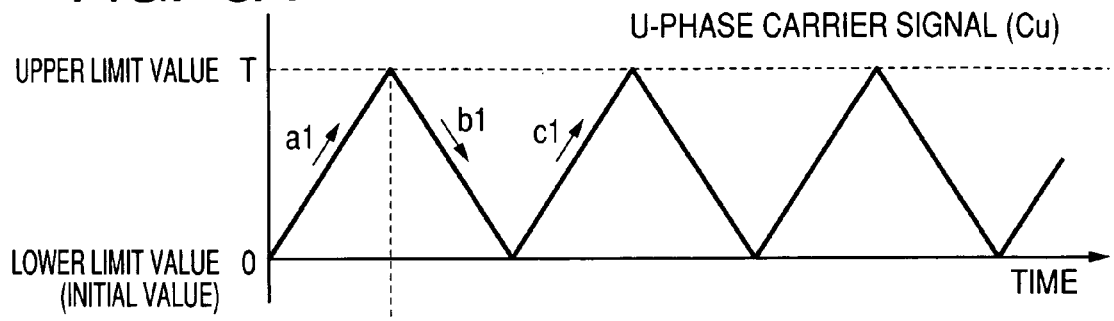
FIGS. 3 A–D are views for describing a principle for generating triangular wave carrrier signals of respective phases.

The principle of generation of the triangular wave carrier signals of respective phases will now be described by reference to FIGS. 2 and 3. In FIG. 2, when the count start signal is input from the CPU 103 to the up-down counter 12 of the U-phase carrier signal generation section 10, the up-down counter 12 starts counting the number of clock signals output from the clock generator 105. Here, as mentioned previously, the initial value is set in the up-down counter 12, and this initial value is set to 0. Therefore, the up-down counter 12 starts counting operation from 0. Moreover, the output from the flip-flop 15 for commanding the up-down counter 12 to perform cumulative addition or subtraction is set to "H" in an initial state. Consequently, when the up-down counter 12 has started counting operation, cumulative addition of the count value is performed. As a result, as shown in FIG. 3A, with lapse of time the output from the up-down counter 12 increases from 0, which is the lower limit value (initial value), toward the upper limit value T as indicated by arrow a1. When the count value has reached the upper limit value T, the comparator 13 detects attainment of the upper limit value T and sends a detection output to the flip-flop 15. The flip-flop 15 is inverted by the signal and outputs an "L" signal. Therefore, operation of the up-down counter 12 is reversed from cumulative addition to cumulative subtraction. As shown in FIG. 3A, with lapse of time the output from the up-down counter 12 decreases from the upper limit value T toward the lower limit value 0 as indicated by arrow b1. When the count value has reached the lower limit value 0, the comparator 14 detects attainment of the lower limit value 0 and sends a detection output to the flip-flop 15. The flip-flop 15 is inverted by this signal and outputs an "H" signal. Therefore, the operation of the up-down counter 12 is again inverted, to cumulative addition, and the output from the up-down counter 12 increases from the lower limit value 0 to the upper limit value T as indicated by an arrow c1. Through repetition of such cumulative addition and subtraction operations, a triangular wave U-phase carrier signal Cu, such as that shown in FIG. 3A, is output from the up-down counter 12. In the first embodiment, this U-phase carrier signal Cu is taken as a reference triangular wave carrier signal.

Figure 3B:
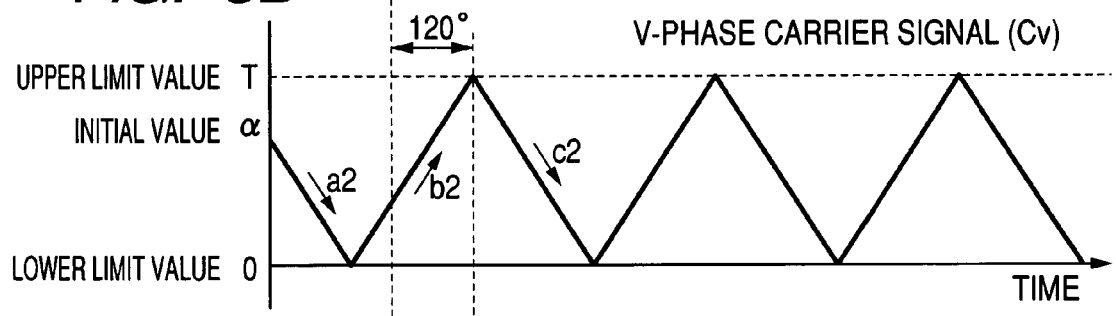

The count start signal output from the CPU 103 is also simultaneously imparted to the up-down counter 22 of the V-phase carrier signal generation section 20. Upon receipt of the count start signal, the up-down counter 22 starts counting the number of clock signals output from the clock generator 105. As mentioned previously, the initial value is set in the up-down counter 22, and this initial value is set to a value α, which is not 0. Therefore, the up-down counter 22 starts counting operation from α. Moreover, the output from the flip-flop 25 for commanding the up-down counter 22 to perform cumulative addition or subtraction is set to "L" in an initial state. Consequently, when the up-down counter 22 has started counting operation, cumulative subtraction of the count value is performed. As a result, as shown in FIG. 3B, with lapse of time the output from the up-down counter 22 decreases from the initial value α toward the lower limit value 0 as indicated by arrow a2. When the count value has reached the lower limit value 0, the comparator 24 detects attainment of the lower limit value 0 and sends a detection output to the flip-flop 25. The flip-flop 25 is inverted by the signal and outputs an "H" signal. Therefore, operation of the up-down counter 22 is reversed from cumulative subtraction to cumulative addition. As shown in FIG. 3B, the output from the up-down counter 22 is increased from the lower limit value 0 toward the upper limit value T with lapse of time as indicated by arrow b2. When the count value has reached the upper limit value T, the comparator 23 detects attainment of the upper limit value T and sends a detection output to the flip-flop 25. The flip-flop 25 is inverted by this signal and outputs an "L" signal. Therefore, the operation of the up-down counter 22 is again inverted, to cumulative subtraction, and the output from the up-down counter 22 decreases from the upper limit value T to the lower limit value 0 as indicated by an arrow c2. Through repetition of such cumulative addition and subtraction operations, a triangular wave V-phase carrier signal Cv, such as that shown in FIG. 3B, is output from the up-down counter 22.

Figure 3C:
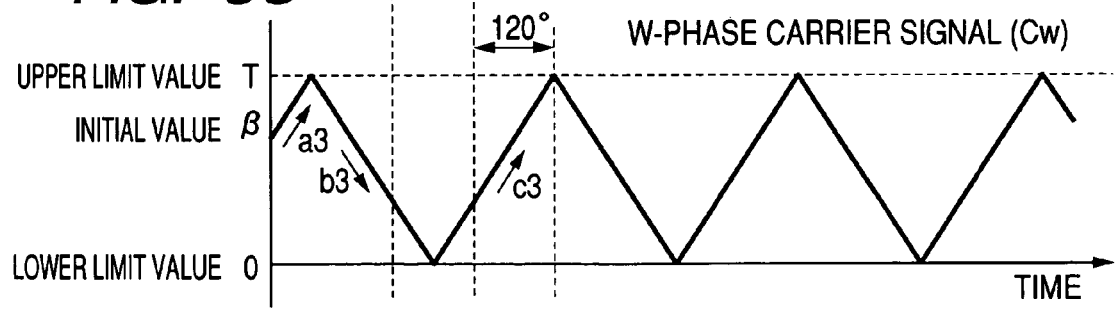
Figure 3D:
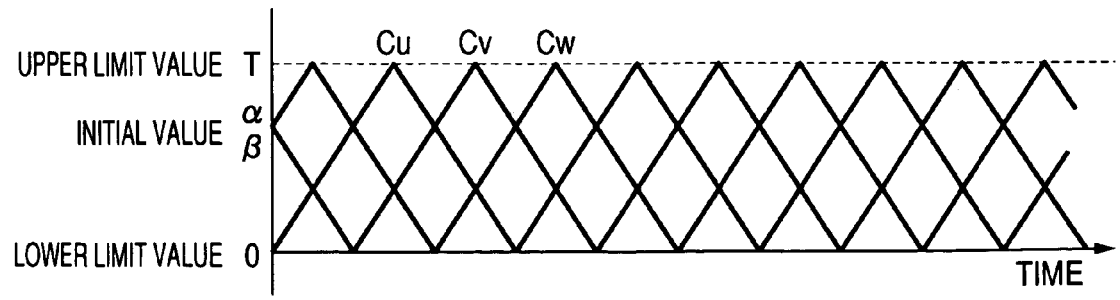

The count start signal output from the CPU 103 is also simultaneously imparted to the up-down counter 32 of the W-phase carrier signal generation section 30. Upon receipt of the count start signal, the up-down counter 32 starts counting the number of clock signals output from the clock generator 105. As mentioned previously, the initial value is set in the up-down counter 32, and this initial value is set to a value β, which is not 0. Therefore, the up-down counter 32 starts counting from the value β. The value β is equal to the value α. An output from the flip-flop 35 for commanding the up-down counter 32 to perform cumulative addition or subtraction is set to "H" in an initial state. Consequently, when the up-down counter 32 has started counting operation, cumulative subtraction of the count value is performed. As a result, as shown in FIG. 3C, with lapse of time the output from the up-down counter 32 increases from the initial value β toward the upper limit value T as indicated by arrow a3. When the count value has reached the upper limit value T, the comparator 33 detects attainment of the upper limit value T and sends a detection output to the flip-flop 35. The flip-flop 35 is inverted by the signal and outputs an "L" signal. Therefore, operation of the up-down counter 32 is reversed from cumulative addition to cumulative subtraction. As shown in FIG. 3C, the output from the up-down counter 32 decreases the upper limit value T toward the lower limit value 0 with lapse of time as indicated by arrow b3. When the count value has reached the lower limit value 0, the comparator 34 detects attainment of the lower limit value 0 and sends a detection output to the flip-flop 35. The flip-flop 35 is inverted by this signal and outputs an "H" signal. Therefore, the operation of the up-down counter 32 is again inverted, to cumulative addition, and the output from the up-down counter 32 increases from the lower limit value 0 to the upper limit value T as indicated by an arrow c3. Through repetition of such cumulative addition and subtraction operations, a triangular wave W-phase carrier signal Cw, such as that shown in FIG. 3C, is output from the up-down counter 32.

In FIG. 3, the V-phase carrier signal Cv has a phase difference of 120° in the lagging direction with respect to the U-phase carrier signal Cu, which is a reference triangular wave carrier signal. The W-phase carrier signal Cw has a phase difference of 120° in the lagging direction with respect to the V-phase carrier signal Cv. Therefore, the W-phase carrier signal Cw has a phase difference of 240° in the lagging direction with respect to the U-phase carrier signal Cu, which is the reference triangular wave carrier signal. Specifically, the U-phase carrier signal Cu, the V-phase carrier signal Cv, and the W-phase carrier signal Cw are triangular wave signals which are out of phase with each other by 120°. FIG. 3D is a view made by plotting the carrier signals Cu, Cv and Cw of respective phases in an overlapping manner.

FIG. 4 is a table showing an example of how the initial value of the up-down counter and the initial value of the flip-flop are set when a predetermined phase difference (a phase difference in the phase lagging direction) is provided with respect to the reference triangular wave carrier signal. The table is based on the premise that the upper limit values of the up-down counters of respective phases are set to the single value (T) and that the lower limit values of the same are set to the single value (0). Further, the table shows a relationship between a phase difference, a ratio of an initial value to an upper limit value, and an initial command value achieved on condition that the initial value of the reference triangular wave carrier signal is taken as 0 and the initial command value is taken as "H". When the phase difference falls within the range of 0° to 180°, a ratio "m" of the initial value of the up-down counter to an upper limit value is defined as follows:

$$m = \text{phase difference}/180°.$$

When the phase difference falls within the range of 180° to 360°, a ratio "n" of the initial value of the up-down counter to the upper limit value is defined as follows:

$$n = 2 - [\text{phase difference}/180°].$$

When the three-phase triangular wave carrier signals are generated with an equal phase difference (120°) as in the case shown in FIG. 3, the initial value is set to 0 as can be seen from FIG. 4, because the phase difference is 0°. The initial command value of the flip-flop achieved at this time becomes "H" (an addition command). In relation to the V-phase carrier signal Cv having a phase difference of 120° with respect to the U-phase carrier signal Cu, the essential requirement is to set the initial value α to two-thirds the upper limit value T, as can be seen from FIG. 4. The initial command value of the flip-flop achieved at this time becomes "L" (a subtraction command). In relation to the W-phase carrier signal Cw having a phase difference of 240° with respect to the U-phase carrier signal Cu, the essential requirement is to set the initial value β to two-thirds the upper limit value T, as can be seen from FIG. 4. The initial command value of the flip-flop achieved at this time becomes "H" (an addition command).

Requirements for generating the U-phase carrier signal Cu, which becomes a reference; the V-phase carrier signal Cv, whose phase lags the U phase by 120°; and the W-phase carrier signal Cw, whose phase lags the U phase by 240°, are summarized as follows:

(1) U-phase carrier signal Cu (reference triangular wave carrier signal)

Initial value of up-down counter=0

Initial command value of flip-flop="H"

(2) V-phase carrier signal Cv

Initial value α of up-down counter=2T/3

Initial command value of flip-flop="L"

(3) W-phase carrier signal Cw

Initial value β of up-down counter=2T/3

Initial command value of flip-flop="H"

As mentioned above, the carrier signal generation sections 10, 20 and 30 for generating carrier signals of three phases, the phases being out of phase with each other, are provided for respective phases. The carrier signal generation sections are provided with the up-down counters 12, 22 and 32, respectively. The up-down counters 12, 22 and 32 perform counting operations in accordance with clock signals. When the count value has reached the upper limit value, the up-down counter performs cumulative subtraction operation. In contrast, when the count value has reached the lower limit value, the up-down counter performs cumulative addition operation. As a result, the three-phase carrier signals Cu, Cv and Cw, each being formed from a triangular wave having a predetermined phase difference to another phase, can be readily generated for respective phases. Therefore, a triangular wave carrier signal having an accurate waveform and a phase difference, both corresponding to a count value, can be obtained without involvement of complicated waveform processing, by means of performing only digital addition and subtraction through use of an up-down counter or the like.

In the first embodiment, initial values corresponding to the phase differences are set for the respective up-down counters 12, 22 and 32 of the carrier signal generation sections 10, 20 and 30. The respective up-down counters 12, 22 and 32 are arranged so as to subject the initial values to cumulative addition or cumulative subtraction. Therefore, a phase difference existing between the carrier signals Cu, Cv and Cw output from the up-down counters 12, 22 and 32 can be set arbitrarily. Consequently, triangular wave carrier signals, which are required for PWM control of, e.g., a three-phase motor, and are out of phase with each other by 120°, can be readily obtained with high accuracy.

In the first embodiment, the CPU 103 controlling operations of the respective carrier signal generation sections 10, 20 and 30 simultaneously provides the respective up-down counters 12, 22 and 32 with a count start signal for starting counting of the number of clock signals. Upon receipt of this count start signal, the respective up-down counters 12, 22 and 32 concurrently start counting operations. As a result, occurrence of a lag among the timings at which the counting operations of the respective phases are started is prevented, thereby enhancing the accuracy of a phase difference among the carrier signals of respective phases. The clock generators 105 can also be provided for respective phases. In this case, a difference may arise between the clock signals for respective phases. Hence, supply of a clock signal from the single clock generator 105 to the up-down counters of respective phases is preferable.

The triangular wave carrier signals Cu, Cv and Cw generated by the respective up-down counters 12, 22 and 32 are delivered to the comparators 16, 26 and 36, respectively. The comparator 16 compares the U-phase command voltage with the U-phase carrier signal Cu; the comparator 26 compares the V-phase command voltage with the V-phase carrier signal Cv; and the comparator 36 compares the W-phase command voltage with the W-phase carrier signal Cw. Outputs from the comparators 16, 26 and 36 are input to the PWM circuit 108. The principle on which the PWM circuit 108 generates a PWM signal on the basis of results of comparison between the carrier signal with the command voltage performed by the comparators 16, 26 and 36 is completely the same as that described by reference to FIG. 10. Hence, its explanation is omitted here.

The first embodiment has described, as an example, the three-phase carrier signal generator for generating the U-phase carrier signal, the V-phase carrier signal, and the W-phase carrier signal. However, according to the present invention, the number of phases is not limited to three; carrier signal generation sections are provided in equal number to the phases. Carrier signals corresponding to an arbitrary number of phases, such as two phases, four phases, five phases, or six phases, can be generated by means of the initial values of the respective up-down counters and the initial command values of the flip-flops. As can be seen from FIG. 4, according to the present invention, an arbitrary phase difference can be imparted to the carrier signals by means of selecting the initial values of the up-down counters. In the case of, e.g., four phases, an initial value is set to ½ the upper limit for the carrier signal having a phase difference of 90° with respect to the reference triangular wave carrier signal. The initial value is set so as to become equal to the upper limit value for a carrier signal having a phase difference of 180°. The initial value is set to ½ the upper limit for the carrier signal having a phase difference of 270° with respect to the reference triangular wave carrier signal. The initial values of the respective flip-flops achieved at this time become "L," "L," and "H." In the case of, e.g., five phases, an initial value is set to ⅖ the upper limit for the carrier signal having a phase difference of 72° with respect to the reference triangular wave carrier signal. The initial value is set to ⅘ the upper limit for the carrier signal having a phase difference of 144° with respect to the reference triangular wave carrier signal. The initial value is set to ⅘ the upper limit for the carrier signal having a phase difference of 216° with respect to the reference triangular wave carrier signal. The initial value is set to ⅖ the upper limit for the carrier signal having a phase difference of 288° with respect to the reference triangular wave carrier signal. The initial values of the respective flip-flops achieved at this time become "L," "L," "H," and "H."

In the foregoing example, the phase differences are set to equal intervals. However, the phase differences among the carrier signals may be set to uneven intervals. For instance, in the case of three phases, the phase difference of the V-phase carrier signal from the U-phase carrier signal which is the reference triangular wave carrier signal may be 90°, and the phase difference of the W-phase carrier signal from the U-phase carrier signal which is the reference triangular wave carrier signal may be 240°. Even in this case, the initial values can be set by reference to FIG. 4. The only requirement is to set the initial value of the V-phase carrier signal to ½ the upper limit value and set the initial value of the W-phase carrier signal to ⅔ the upper limit value.

As mentioned previously, in FIG. 2, the detection signals output from the comparators 13, 23 and 33 are taken as the peak interrupt signals INT1U, INT1V and INT1W. The detection signals output from the comparators 14, 24 and 34 are taken as the valley interrupt signals INT2U, INT2V and INT2W. These interrupt signals are delivered to an interrupt controller 109 shown in FIG. 1. As mentioned previously, if the detection signal formed from the upper limit count value or the lower limit count value is utilized as an interrupt signal, an interrupt can be made in the CPU 103 at a position between the peak and valley of the triangular wave carrier signal.

Figure 5:
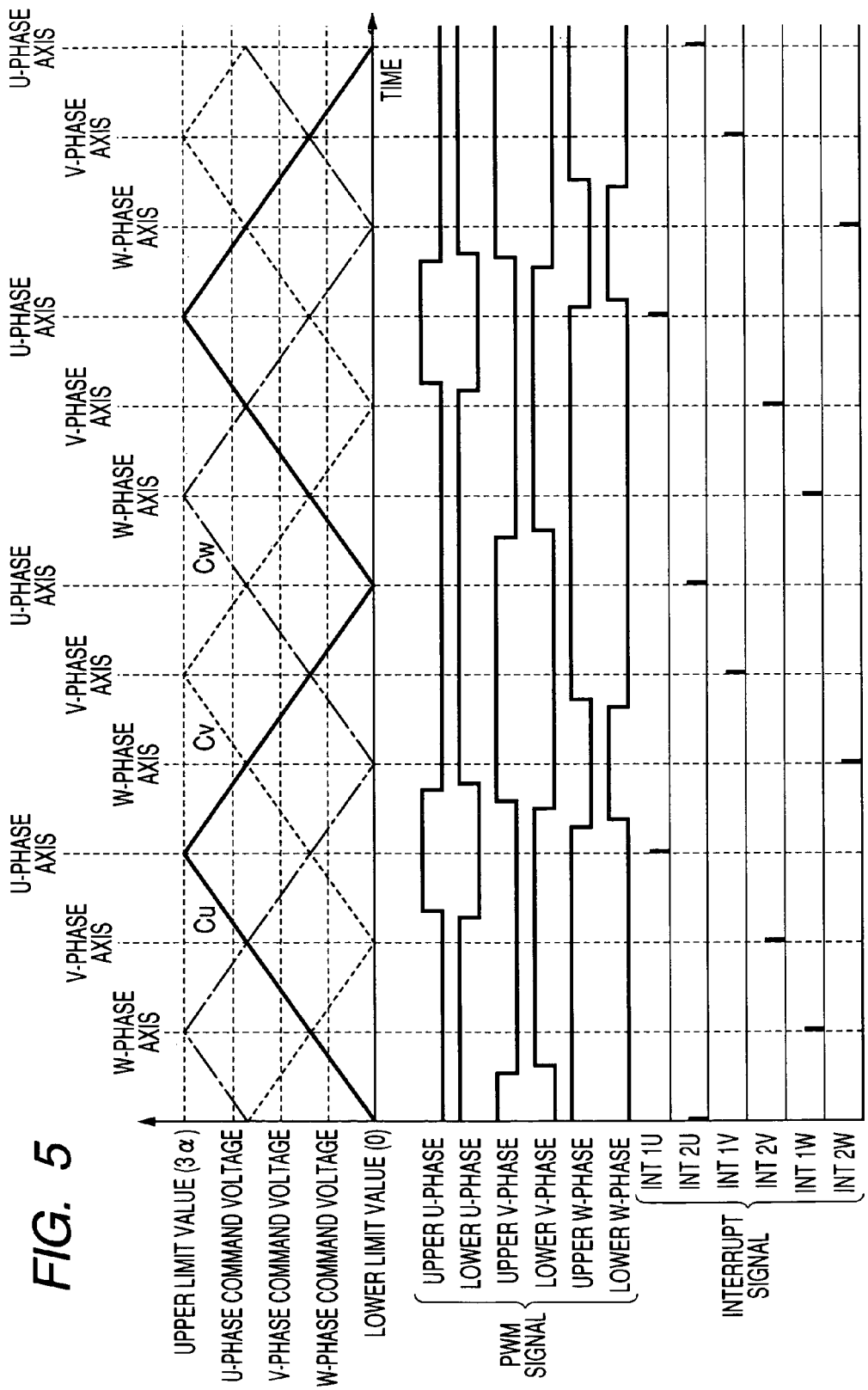
FIG. 5 is a timing chart for describing an interrupt between a peak and a valley of the triangular wave carrier signal.
Figure 10:
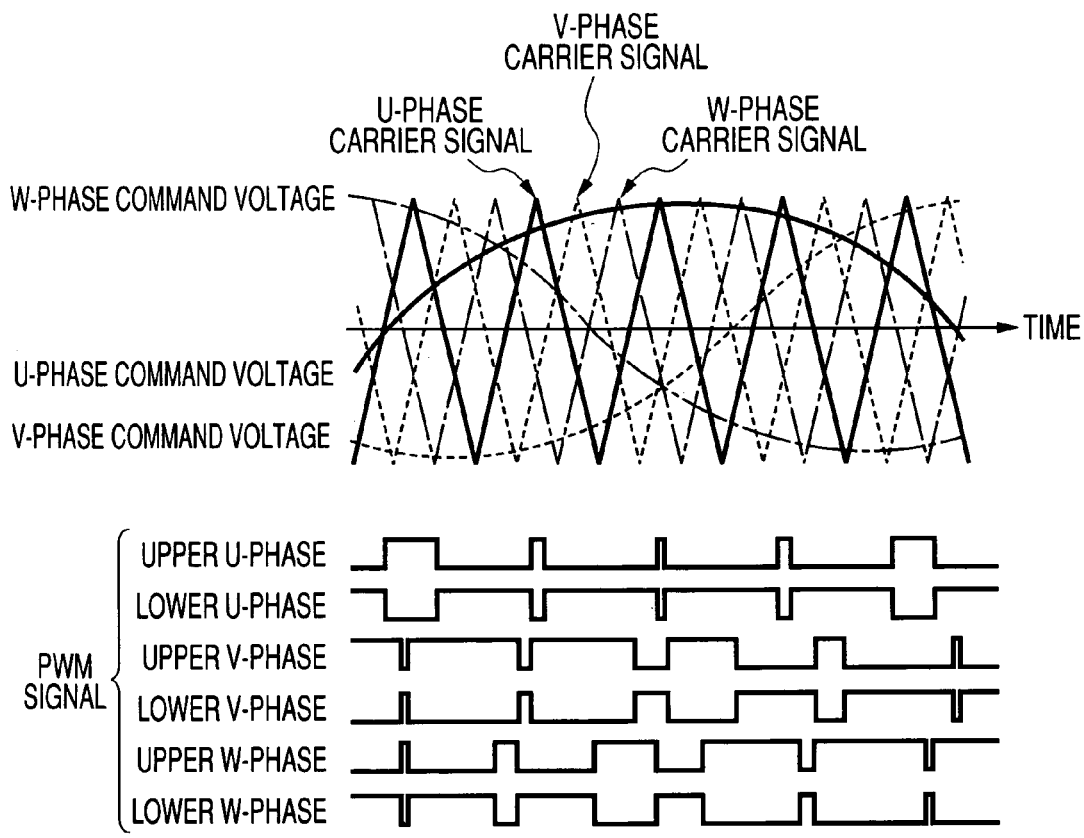
FIG. 10 is a waveform view acquired when independent carrier signals are used for respective phases.

FIG. 5 is a timing chart for describing an interrupt made between the peak and valley of the triangular wave carrier signal. During periods where the amplitude of the carrier signal Cu, that of the carrier signal Cv, and that of the carrier signal Cw become greater than the U-phase command voltage, the V-phase command voltage, and the W-phase command voltage, the switching elements Q1, Q3, and Q5 of respective phases are activated. During periods where the amplitude of the carrier signal Cu, that of the carrier signal Cv, and that of the carrier signal Cw become less than the U-phase command voltage, the V-phase command voltage, and the W-phase command voltage, the switching elements Q2, Q4, and Q6 of respective phases are activated. These are the same as those shown in FIG. 10. The command voltages of respective phases actually change with lapse of time as shown in FIG. 10. When attention is paid on periods of several cycles of the carrier signal, a change in the command voltages is small. Therefore, for the sake of convenience shown in FIG. 5, the command voltages of respective phases are drawn as constant voltages.

As shown in FIG. 5, a U-phase peak interrupt signal INT1U arises in the peak of the U-phase carrier signal Cu (a point in time when the upper limit value is achieved), and a U-phase valley interrupt signal INT2U arises in the valley of the U-phase carrier signal Cu (a point in time when the lower limit value is achieved). Moreover, a V-phase peak interrupt signal INT1V arises in the peak of the V-phase carrier signal Cv, and a V-phase valley interrupt signal INT2V arises in the valley of the V-phase carrier signal Cv. Further, a W-phase peak interrupt signal INT1W arises in the peak of the W-phase carrier signal Cw, and a W-phase valley interrupt signal INT2W arises in the valley of the W-phase carrier signal Cw.

Figure 6:
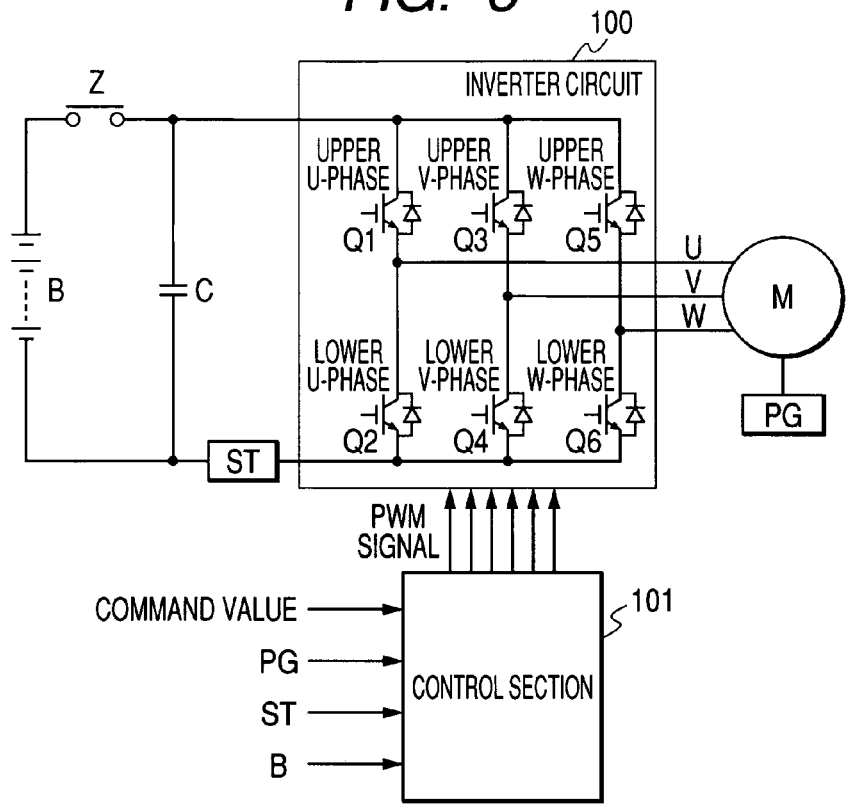
FIG. 6 is a view showing a common controller of a three-phase AC motor.
Figure 7:
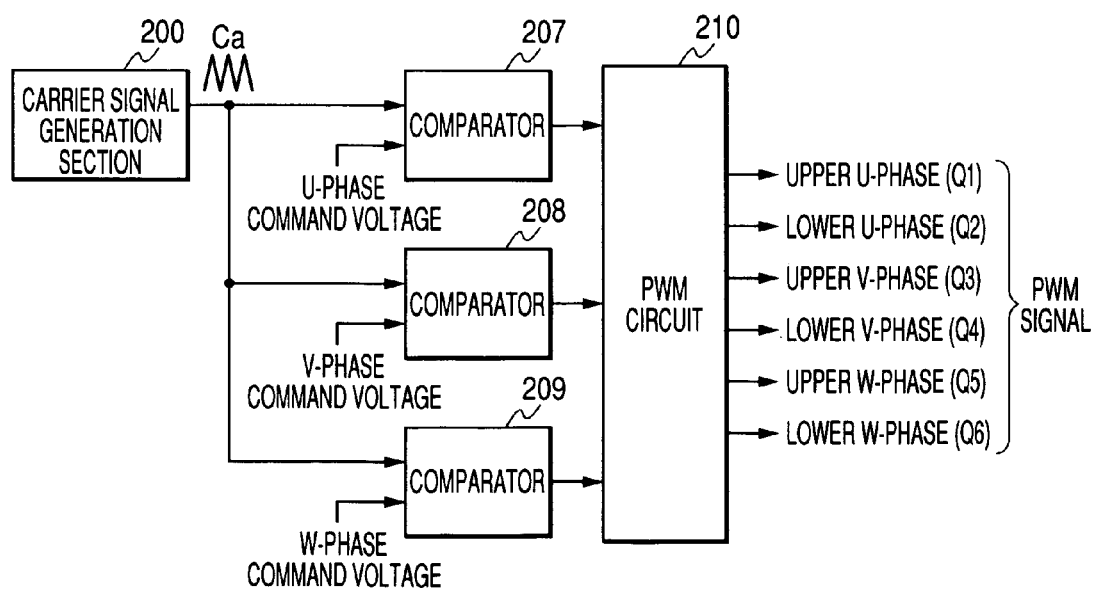
FIG. 7 is a view showing the configuration of a PWM signal generation section.
Figure 8:
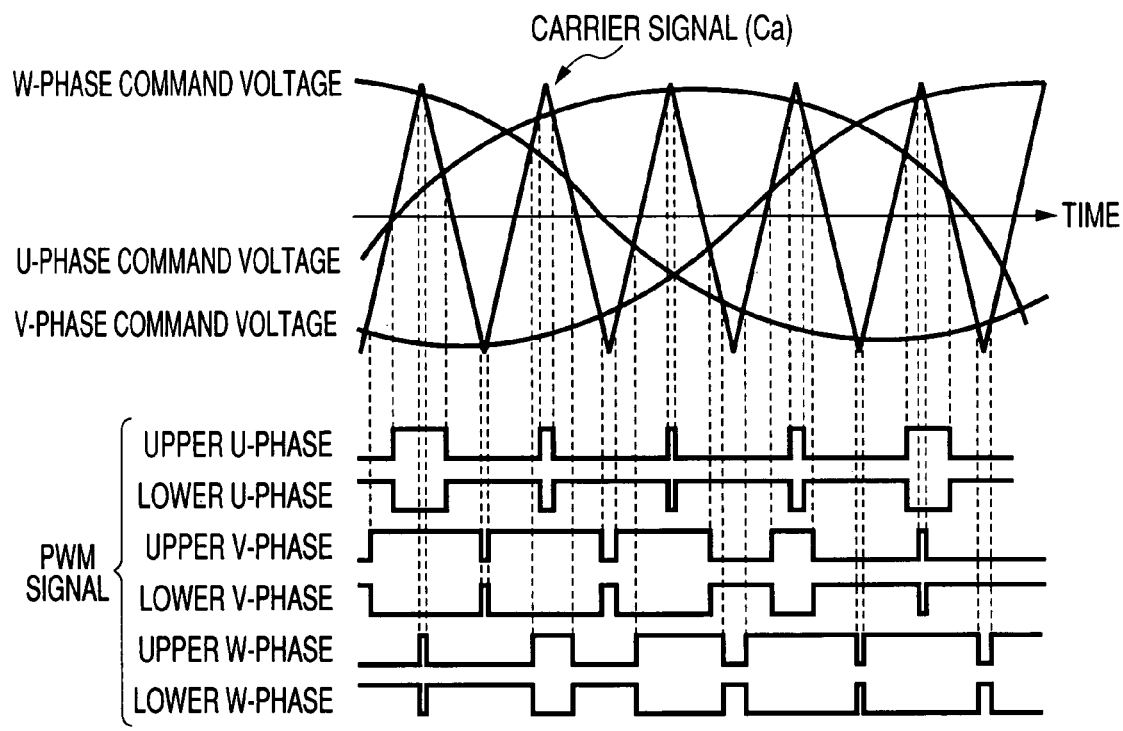
FIG. 8 is a view for describing a principle for generating a PWM signal.
Figure 9:
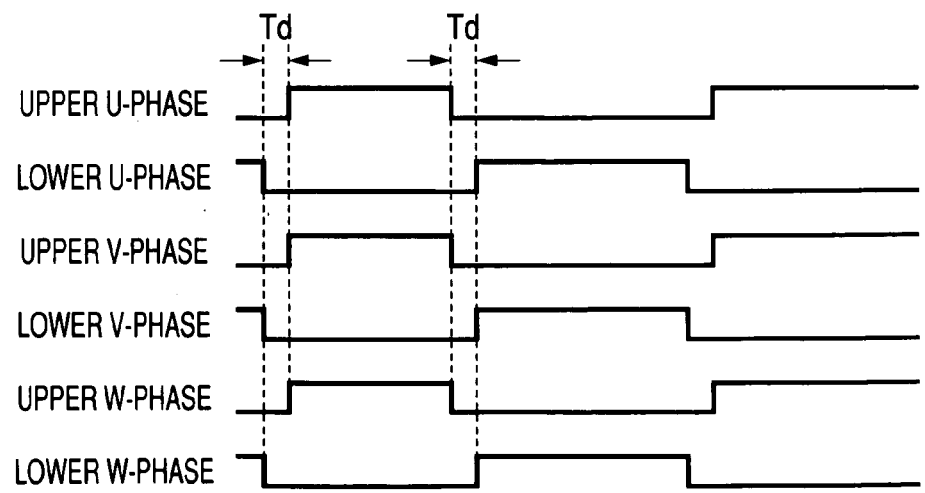
FIG. 9 is a view for describing an overlap between dead time periods.

As can be seen from FIG. 6, the PWM signals given to the switching elements Q1 to Q6 of respective phases do not rise or fall but stably remain in an "H" state, at the timings of the peak and valleys of the respective phases at which the interrupt signals such as those mentioned previously arise. The peak interrupt signals INT1U, INT1V and INT1W corresponding to respective phases have arisen at intermediate timings of the "H" periods (from the rise to the fall of the signal) of the PWM signals of respective upper phases, and the valley interrupt signals INT2U, INT2V and INT2W corresponding to respective phases have arisen at intermediate timings of the "H" periods of the PWM signals of respective lower phases. Consequently, the switching elements Q1 to Q6 remain in the most stable state at these intermediate timings. Therefore, an interrupt is made in the CPU 103 by way of the interrupt controller 109, whereby various types of control operations can be performed stably. For instance, a motor current (an electric current of the shunt ST) is subjected to analog-to-digital conversion at the timings of the valley interrupt signals INT2U, INT2V and INT2W by means of the analog-to-digital converter 102. A battery voltage or the like other than the motor current can be subjected to analog-to-digital conversion at the timings of the peak interrupt signals INT1U, INT1V and INT1W by means of the analog-to-digital converter 102. At the timings of the peak interrupt signals INT1U, INT1V and INT1W, the CPU 103 performs fault diagnosis of the upper switching elements Q1, Q3 and Q5 of respective phases in the inverter circuit 100. At the timings of the valley interrupt signals INT2U, INT2V and INT2W, the CPU 103 performs fault diagnosis of the lower switching elements Q2, Q4 and Q6 of respective phases in the inverter circuit 100.

Although the reference triangular wave carrier signal (the U-phase carrier signal Cu) is caused to arise in the valley (the lower limit value) in the first embodiment, the reference triangular wave carrier signal may be caused to arise in the peak (the upper limit value). In this case, the initial value of the reference triangular wave carrier signal is T (the upper limit value), and the initial command value is "L". The reference triangular wave carrier signal comes to be out of phase with the carrier signal developing in the valley by 180°. Therefore, at the time of setting of another phase through use of FIG. 4, the essential requirement is to read the table by taking the values for a phase difference of 180° as reference values. For instance, when the phase difference from the reference triangular wave carrier signal is 90° (from 0° to 180°), the only requirement is to set the initial value T/2 and the initial command value "H" for the case of a phase difference of 270° (=180°+90°). Moreover, when the phase difference is 270° (from 180° to 360°), the only requirement is to set the initial value T/2 and the initial command value "L" for the case of a phase difference of 90° (=180°+270°−360°).

Although, in the first embodiment, the command voltage to be compared with the carrier signal is a voltage, the command value may be an electric current. In the first embodiment, the upper limit count value is set to a single value for all phases, and the lower limit count value is also set to a single value for all phases. However, the upper and lower limit values may be set to different values from one phase to another phase. Moreover, the motor controller to which the present invention is applied is taken as an example in the first embodiment. However, the present invention can also be applied to various types of controllers other than the motor controller.

Second Embodiment

Figure 13:
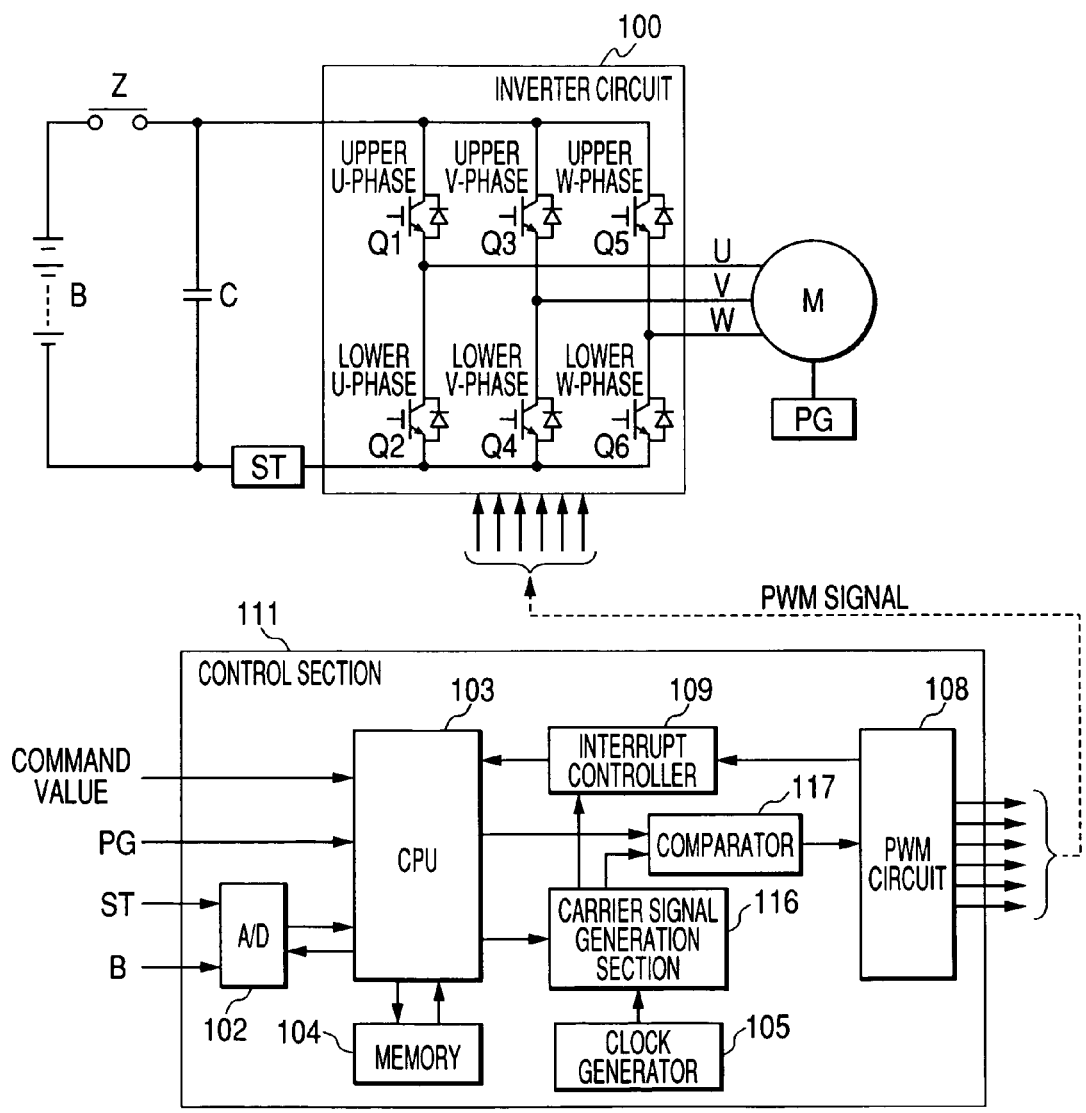
FIG. 13 is a block diagram of a motor controller using a multi-phase carrier signal generator according to a second embodiment of the present invention.

FIG. 13 shows an example of a controller of a three-phase AC motor equipped with a multi-phase carrier signal generator according to a second embodiment of the present invention. The controller shown in FIG. 13 is identical in basic configuration to the first embodiment of the present invention except the carrier signal generation section 116 and the comparator 117, and hence its explanation is omitted.

A control section 111 is equipped with the analog-to-digital converter 102, the CPU 103, the memory 104, the clock generator 105, a carrier signal generation section 116, a comparator 117, the PWM circuit 108, and the interrupt controller 109. The multi-phase carrier signal generator according to the second embodiment of the present invention is formed from the clock generator 105 and the carrier signal generation section 116.

Figure 14:
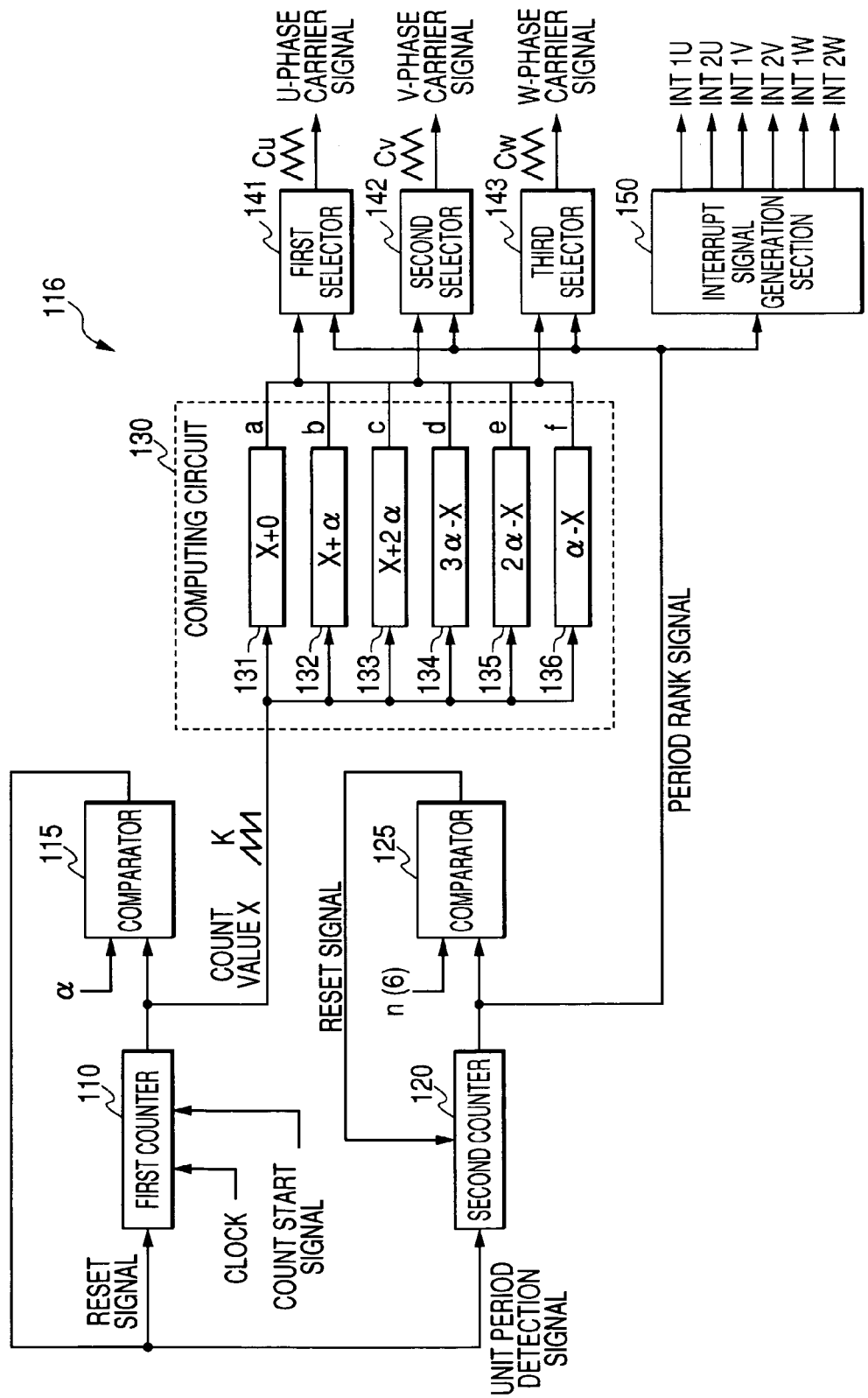
FIG. 14 is a block diagram showing details of the carrier signal generation section.

FIG. 14 is a detailed block diagram of the carrier signal generation section 116 shown in FIG. 13. Reference numeral 110 designates a first counter; 115 designates a comparator for comparing a count value of the first counter 110 with the reference value; 120 designates a second counter; 125 designates a comparator for comparing a count value of the second counter 120 with the reference value; 130 designates a computing circuit for performing a predetermined arithmetic operation of the count value of the first counter 110; 141 to 143 designate selectors provided for respective phases; and 150 designates an interrupt signal generation section for generating interrupt signals of respective phases.

Figure 16A:
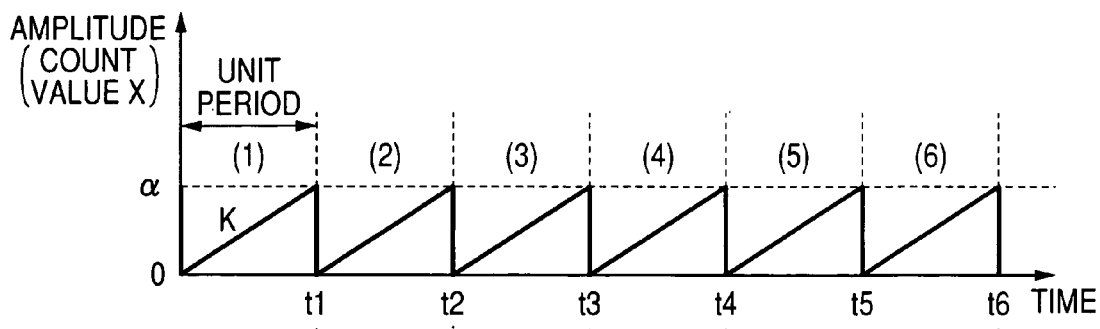
FIGS. 16 A–C are views for describing a principle for generating multi-phase carrier signals.

A clock signal output from the clock generator 105 shown in FIG. 13 and a count start signal delivered from the CPU 103 are input to the first counter 110. Upon receipt of the count start signal from the CPU 103, the first counter 110 starts counting the number of clock signals and subjects a count value X to cumulative addition (one is added every time a clock signal is input), to thus generate a reference wave signal K to be described later. The comparator 11 compares the count value X of the first counter 110 with the peak value $\alpha$ of the reference wave K, to thus output a detection signal (a first detection signal) when the count value X has reached $\alpha$. This detection signal is delivered as a reset signal to the first counter 110, and the count value X of the first counter 110 is reset to 0 by the reset signal. Consequently, the waveform of the reference wave signal K output from the first counter 110 turns into a sawtooth wave as shown in FIG. 16A. One cycle of the reference wave signal K corresponds to a time from when the first counter 110 starts counting the number of clock signals until the count value is reset by the peak value $\alpha$. A period of one cycle will be hereinafter called a "unit period." FIG. 16A shows six unit periods (1) to (6).

The detection signal output from the comparator 11 is a signal output for each unit period and delivered as a unit period detection signal to the second counter 120. The second counter 120 counts the number of times the detection signal is input and subjects the count value to cumulative addition (one is added every time a detection signal is input). Consequently, a period rank signal representing the position of the unit period in sequence is output from the second counter 120. The comparator 125 compares the count value (the rank of a period) of the second counter 120 with the reference value "n" and outputs a detection signal (the rank of a period) when the count value has reached "n." This detection signal is imparted to the second counter 120 as a reset signal, and the count value of the second counter 120 is reset to 0 by the reset signal. The value of the reference value "n" corresponds to the number of unit periods included in the period of one cycle of the triangular wave carrier signal. In the second embodiment, the number of unit periods is six as shown in FIG. 16A, and hence the reference value "n" is set to six. Therefore, when having counted the period rank up to six, the second counter 120 performs counting operation for the next input unit period detection signal while taking a unit period detection signal as one.

The count value X (the value of amplitude of the reference wave signal K) cumulatively added by the first counter 110 is delivered to the computing circuit 130. The computing circuit 130 has adding circuits 131 to 133 for subjecting the count value X to predetermined addition, and subtracting circuits 134 to 136 for subjecting the predetermined value X to predetermined subtraction. The adding circuit 131 subjects the count value X to arithmetic operation of X+0; the adding circuit 132 subjects the count value X to arithmetic operation of x+$\alpha$; and the adding circuit 133 subjects the count value X to arithmetic operation of x+2$\alpha$. The subtracting circuit 134 subjects the count value X to arithmetic operation of 3$\alpha$–X; the subtracting circuit 135 subjects the count value X to arithmetic operation of 2$\alpha$–X; and the subtracting circuit 136 subjects the count value X to arithmetic operation of $\alpha$–X. The computing circuit 30 generates, from one reference wave signal K, six waveform elements constituting the triangular wave carrier signal by means of these arithmetic operations. Details of these operations will be described later. On the basis of the period rank signal delivered from the second counter 120, the selectors 141 to 143 select, for each unit period, one from operation results (waveform elements) made by the computing circuit 130. Consequently, the U-phase triangular wave carrier signal Cu (hereinafter called a U-phase carrier signal) is output from the first selector 141; the V-phase triangular wave carrier signal Cv (hereinafter called a V-phase carrier signal) is output from the second selector 142; and the W-phase triangular wave carrier signal Cw (hereinafter called a W-phase carrier signal) is output from the third selector 143.

The period rank signal output from the second counter 120 is delivered to an interrupt signal generation section 150 too. On the basis of this signal, the interrupt signal generation section 150 outputs six types of interrupt signals INT1U to INT2W. As mentioned previously, in the first embodiment of the present invention, the signals INT1U, INT1V and INT1W are peak interrupt signals which arise in the peaks of the carrier signals Cu, Cv and Cw of respective phases. The signals INT2U, INT2V and INT2W are valley interrupt signals which arise in the valleys of the carrier signals Cu, Cv and Cw of respective phases. These interrupt signals are delivered to the interrupt controller 109 (FIG. 13), and the interrupt controller 109 makes an interrupt on the CPU 103 at the timings of the respective interrupt signals.

The carrier signals Cu, Cv and Cw output from the selectors 141 to 143 are input to the comparator 117 (FIG. 13). As shown in FIG. 15, the comparator 117 is formed from comparators 161, 162 and 163 provided for respective phases. The comparator 161 compares the value of the U-phase command voltage sent from the CPU 103 with the amplitude of the U-phase carrier signal Cu. During a period in which the amplitude of the U-phase carrier signal Cu is greater than the U-phase command voltage, the comparator 161 outputs an "H" signal. During a period in which the amplitude of the U-phase carrier signal Cu is less than the U-phase command voltage, the comparator 161 outputs an "L" signal. The comparator 162 compares the value of the V-phase command voltage sent from the CPU 103 with the amplitude of the V-phase carrier signal Cv. During a period in which the amplitude of the V-phase carrier signal Cv is greater than the V-phase command voltage, the comparator 161 outputs an "H" signal. During a period in which the amplitude of the V-phase carrier signal Cv is less than the V-phase command voltage, the comparator 161 outputs an "L" signal. The comparator 163 compares the value of the W-phase command voltage sent from the CPU 103 with the amplitude of the W-phase carrier signal Cw. During a period in which the amplitude of the W-phase carrier signal Cw is greater than the W-phase command voltage, the comparator 163 outputs an "H" signal. During a period in which the amplitude of the W-phase carrier signal Cw is less than the W-phase command voltage, the comparator 163 outputs an "L" signal.

Figure 11:
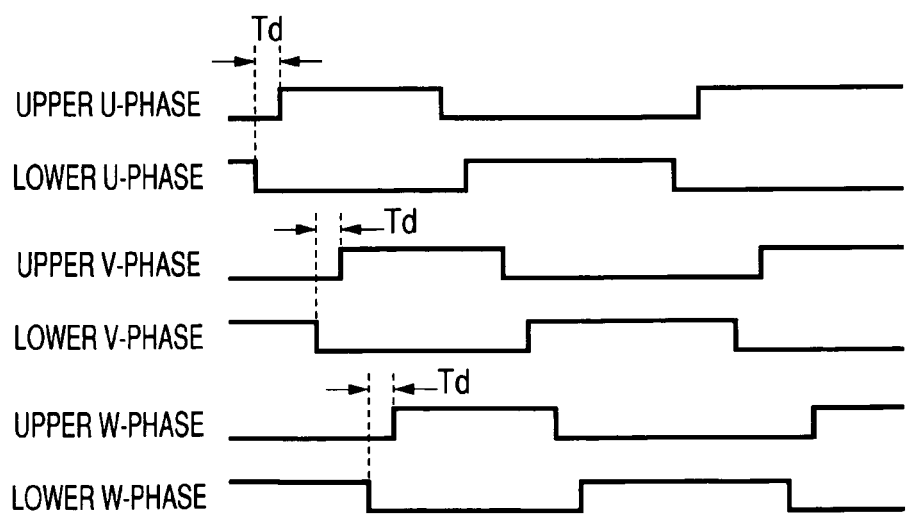
FIG. 11 is a view for describing a difference between the dead time periods.
Figure 12:
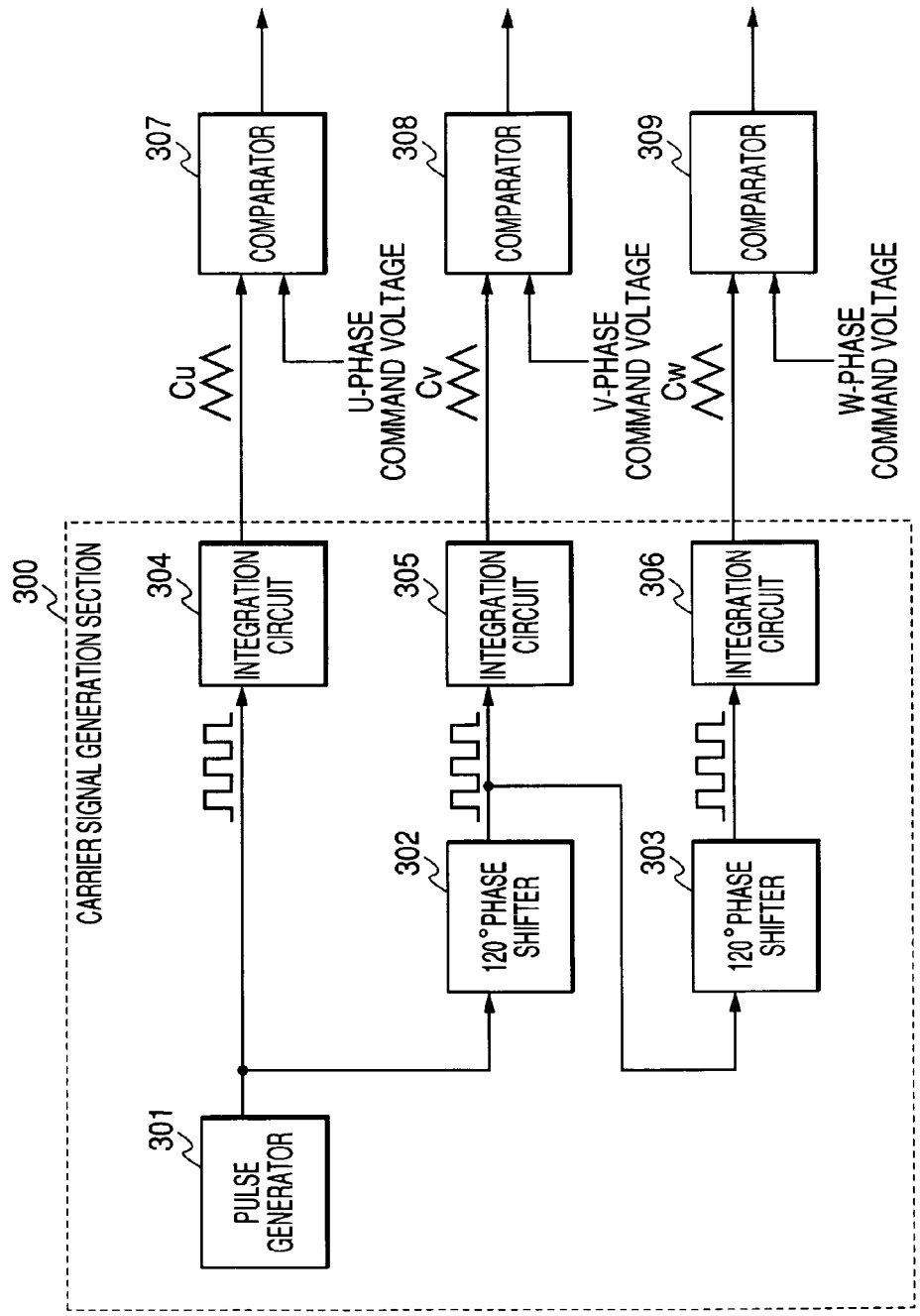
FIG. 12 is a comparative example showing the configuration of a carrier signal generation section.

Outputs from the comparators 161, 162 and 163 are input to the PWM circuit 108. In accordance with the "H" or "L" signals output from the comparators 161, 162 and 163, the PWM circuit 108 generates six types of PWM signals for activating the switching elements Q1 to Q6 of respective phases. The principle of generation of the PWM signals is completely identical with that described by reference to FIG. 11, and hence its explanation is omitted.

By means of the configuration, the clock generator 105 corresponds to the clock generation method of the present invention; the first counter 110 corresponds to the first counting method; the second counter 120 corresponds to the second counting method; the comparator 115 corresponds to first detection method; and the comparator 125 corresponds to second detection method. The clock generator 105, the first counter 110, and the comparator 115 correspond to the reference wave generation method of the present invention, and the selectors 141 to 143 correspond to the selection method. The computing circuit 130 corresponds to the computing method of the present invention; the adding circuits 131 to 133 correspond to the first computing method; and the subtracting circuits 134 to 136 correspond to the second computing method. The interrupt signal generation section 150 corresponds to the interrupt signal generation method of the present invention.

The principle of generation of the triangular wave carrier signals of respective phases will now be described by reference to FIGS. 14 and 16. In FIG. 14, an initial value of the first counter 110 is set to 0 (the lower limit value) at the outset. When the count start signal output from the CPU 103 is input to the first counter 110, the first counter 110 starts counting the number of clock signals output from the clock generator 105 and subjects the resultant count value to cumulative addition. Consequently, the count value X of the first counter 110 increases with lapse of a time. When the count value X has reached $\alpha$ (the upper limit value), the comparator 115 outputs a reset signal. As a result, the count value X of the first counter 110 is reset to 0. The first counter 110 again starts counting the number of clock signals. When the count value X has reached $\alpha$, the first counter 110 is reset to 0 by the reset signal output from the comparator 115.

By means of repetition of these operations, the reference wave signal K formed from a sawtooth wave signal as shown in FIG. 16A is output from the first counter 110. This reference wave signal K is a sawtooth wave signal having amplitude corresponding to the count value X, and the peak value of the reference wave K is $\alpha$. In FIG. 16A, the periods achieved when the period of one cycle of the generated triangular wave carrier signal is divided into six equal parts correspond to unit periods. The reference wave signal K arises in each of the six unit periods (1) to (6). The computing circuit 130 generates waveform elements forming the triangular wave carrier signal through use of the reference waveform signal K (the count value X of the first counter 110). The waveform elements will now be described hereunder.

Figure 16B:
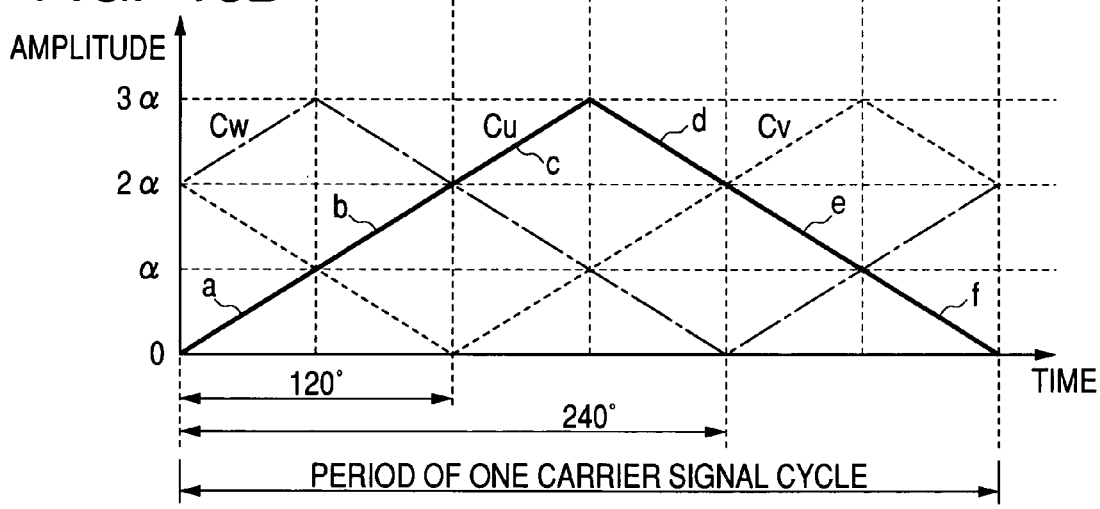

In FIG. 16B, when the U-phase carrier signal Cu is taken as an example, the U-phase carrier signal Cu is formed from waveform elements "a" to "f" in respective unit periods (1) to (6) over the period of one cycle. The waveform elements "a" to "c" constitute an ascending part of the triangular wave carrier signal whose amplitude increases with lapse of a time. The waveform elements "d" to "f" constitute a descending part of the triangular wave carrier signal whose amplitude increases with lapse of a time. The same applies to carrier signals of other phases. For instance, when attention is paid to the V-phase carrier signal Cv, the waveform element of the unit period (1) is identical with "e," and the waveform element of the unit period (2) is identical with "f." The waveform element of the unit period (3) is identical with "a." The waveform element of the unit period (4) is identical with "b." The waveform element of the unit period (5) is identical with "c," and the waveform element of the unit period (6) is identical with "e." When attention is paid to the W-phase carrier signal Cw, the waveform element of the unit period (1) is identical with "c," and the waveform element of the unit period (2) is identical with "d." The waveform element of the unit period (3) is identical with "e." The waveform element of the unit period (4) is identical with "f." The waveform element of the unit period (5) is identical with "a," and the waveform element of the unit period (6) is identical with "b."

Here, the waveform element "a" is one corresponding to a lowest portion of the ascending part of the triangular wave carrier signal. The waveform element "a" has the same amplitude as that (the count value X) of the reference wave signal K and is generated through arithmetic operation of X+0 by the adding circuit 31. The waveform element "b" is one which is subsequent to the waveform element "a" and corresponds to an intermediate portion of the ascending part of the triangular wave carrier signal. The waveform element "b" has an amplitude determined by adding $\alpha$ to the amplitude (the count value X) of the reference wave signal K, and is generated through arithmetic operation of X+$\alpha$ by the adding circuit 32. The waveform element "c" is one which is subsequent to the waveform element "b" and corresponds to the highest portion of the ascending part of the triangular wave carrier signal. The waveform element "c" has an amplitude determined by adding $2\alpha$ to the amplitude (the count value X) of the reference wave signal K, and is generated through arithmetic operation of X+$2\alpha$ by the adding circuit 133. The waveform element "d" is one corresponding to a lowest portion of the descending part of the triangular wave carrier signal. The waveform element "d" has an amplitude determined by subtracting the amplitude (the count value X) of the reference wave signal K from $3\alpha$ and is generated through arithmetic operation of $3\alpha$−X by the subtracting circuit 134. The waveform element "e" is one which is subsequent to the waveform element "d" and corresponds to an intermediate portion of the descending part of the triangular wave carrier signal. The waveform element "e" has an amplitude determined by subtracting the amplitude (the count value X) of the reference wave signal K from $2\alpha$, and is generated through arithmetic operation of $2\alpha$−X by the adding circuit 135. The waveform element "f" is one which is subsequent to the waveform element "e" and corresponds to the lowest portion of the descending part of the triangular wave carrier signal. The waveform element "f" has amplitude determined by subtracting the amplitude (the count value X) of the reference wave signal K from $\alpha$, and is generated through arithmetic operation of $\alpha$−X by the adding circuit 136. As mentioned above, in the adding circuit 130, a total of six waveform elements; that is, three continuous waveform elements forming the ascending part of the triangular waveform carrier signal and three continuous waveform elements forming the descending part of the triangular wave carrier signal, are generated through operations of the adding circuits 131 to 133 and those of the subtracting circuits 134 to 136. The operation is performed by the computing circuit 130 on a per-unit-period basis. Six waveform elements are generated in each of the unit periods.

One is selected from the thus-generated waveform elements for each unit period by the selectors 141 to 143. Details about selecting operation of the selectors will be described hereunder. In the unit period (1), the first selector 141 selects the waveform element "a" generated by the adding circuit 131 through the arithmetic operation of X+0, and outputs the thus-selected waveform element. The second selector 142 selects the waveform element "e" generated by the subtracting circuit 135 through the arithmetic operation of 2α−X, and outputs the thus-selected waveform element. The third selector 143 selects the waveform element "c" generated by the adding circuit 133 through the arithmetic operation of X+2α, and outputs the thus-selected waveform element. As a result, the waveform elements of phases, such as those shown in the unit period (1) shown in FIG. 16B, are output from the selectors 141 to 143.

In the unit period (2), the first selector 141 selects the waveform element "b" generated by the adding circuit 132 through the arithmetic operation of X+α, and outputs the thus-selected waveform element. The second selector 142 selects the waveform element "f" generated by the subtracting circuit 136 through the arithmetic operation of α−X, and outputs the thus-selected waveform element. The third selector 143 selects the waveform element "d" generated by the subtracting circuit 134 through the arithmetic operation of 3α−X, and outputs the thus-selected waveform element. As a result, the waveform elements of phases, such as those shown in the unit period (2) shown in FIG. 16B, are output from the selectors 141 to 143.

In the unit period (3), the first selector 141 selects the waveform element "c" generated by the adding circuit 133 through the arithmetic operation of X+2α, and outputs the thus-selected waveform element. The second selector 142 selects the waveform element "a" generated by the adding circuit 131 through the arithmetic operation of X+0, and outputs the thus-selected waveform element. The third selector 143 selects the waveform element "e" generated by the subtracting circuit 135 through the arithmetic operation of 2α−X, and outputs the thus-selected waveform element. As a result, the waveform elements of phases, such as those shown in the unit period (3) shown in FIG. 16B, are output from the selectors 141 to 143.

In the unit period (4), the first selector 141 selects the waveform element "d" generated by the subtracting circuit 134 through the arithmetic operation of 3α−X, and outputs the thus-selected waveform element. The second selector 142 selects the waveform element "b" generated by the adding circuit 132 through the arithmetic operation of X+α, and outputs the thus-selected waveform element. The third selector 143 selects the waveform element "f" generated by the subtracting circuit 136 through the arithmetic operation of α−X, and outputs the thus-selected waveform element. As a result, the waveform elements of phases, such as those shown in the unit period (4) shown in FIG. 16B, are output from the selectors 141 to 143.

In the unit period (5), the first selector 141 selects the waveform element "e" generated by the subtracting circuit 135 through the arithmetic operation of 2α−X, and outputs the thus-selected waveform element. The second selector 142 selects the waveform element "c" generated by the adding circuit 133 through the arithmetic operation of X+2α, and outputs the thus-selected waveform element. The third selector 143 selects the waveform element "a" generated by the adding circuit 131 through the arithmetic operation of X+0, and outputs the thus-selected waveform element. As a result, the waveform elements of phases, such as those shown in the unit period (5) shown in FIG. 16B, are output from the selectors 141 to 143.

In the unit period (6), the first selector 141 selects the waveform element "f" generated by the subtracting circuit 136 through the arithmetic operation of α−X, and outputs the thus-selected waveform element. The second selector 142 selects the waveform element "d" generated by the subtracting circuit 134 through the arithmetic operation of 3α−X, and outputs the thus-selected waveform element. The third selector 143 selects the waveform element "b" generated by the adding circuit 132 through the arithmetic operation of X+α, and outputs the thus-selected waveform element. As a result, the waveform elements of phases, such as those shown in the unit period (6) shown in FIG. 16B, are output from the selectors 141 to 143.

FIG. 18 collectively shows selecting operations of the selectors 141 to 143 performed during the above-described unit periods (1) to (6). Selecting operations of the respective selectors are performed on the basis of the period rank signal output from the second counter 120. For instance, if the period rank is third, the selectors 141 to 143 perform selecting operations belonging to the unit period (3). If the period rank is fifth, the selectors 141 to 143 perform selecting operations belonging to the unit period (5). A round of operations; that is, the selecting operations belonging to the unit period (1) are again performed after the selecting operations belonging to the unit period (1) to those belonging to the unit period (6) have been performed; is repeated, whereby the carrier signals Cu, Cv and Cw are continuously output. In short, in the ascending part of the triangular waveform carrier signal, the respective selectors select, for each unit period, the waveform elements forming the ascending part in an increasing order from a lower waveform element. In the descending part of the triangular waveform carrier signal, the respective selectors select, for each unit period, the waveform elements forming the descending part in a decreasing order from a higher waveform element. After the highest waveform element "c" forming the ascending part has been selected, the highest waveform element "d" forming the descending part is selected in the next unit period. After the lowest waveform element forming the descending part has been selected, the lowest waveform element "a" forming the ascending part is selected in the next unit period.

As mentioned above, each of the selectors 141 to 143 of respective phases selects one from the waveform elements generated by the computing circuit 130 and outputs the thus-selected waveform element. As a result, the carrier signals Cu, Cv and Cw of respective phases formed from the six waveform elements are obtained over the period of one cycle. As can be seen from FIG. 18, when attention is paid to one unit period, the selectors 141 to 143 select waveform elements which differ from each other. Hence, the carrier signals output from the respective selectors 141 to 143 become triangular wave signals which are out of phase with each other. In the case shown in FIG. 16B, the peak values of the respective carrier signals Cu, Cv and Cw of respective phases are triple (3α) the peak value α of the reference wave signal K. When the U-phase carrier signal Cu is taken as a reference triangular wave carrier signal, the first selector 141 selects the waveform element "a" (X+0) during the first unit period (1) of the period of one cycle. The second selector 142 selects the waveform element "e" (2α−X) and the third selector 143 selects the waveform element "c" (X+2α). Therefore, in the unit period (1), the U-phase carrier signal Cu assumes a waveform whose amplitude starts from 0 and increases. The V-phase carrier signal Cv assumes a waveform whose amplitude starts from 2α and decreases. The W-phase carrier signal Cw assumes a waveform whose amplitude starts from 2α and increases. Consequently, the V-phase carrier signal Cv lags in phase by 120° the U-phase carrier signal Cu that is the reference triangular wave carrier signal. The W-phase carrier signal Cw lags in phase the U-phase carrier signal Cu by 240°. Namely, three-phase carrier signals which are out of phase with each other by 120° are obtained.

Figure 16C:
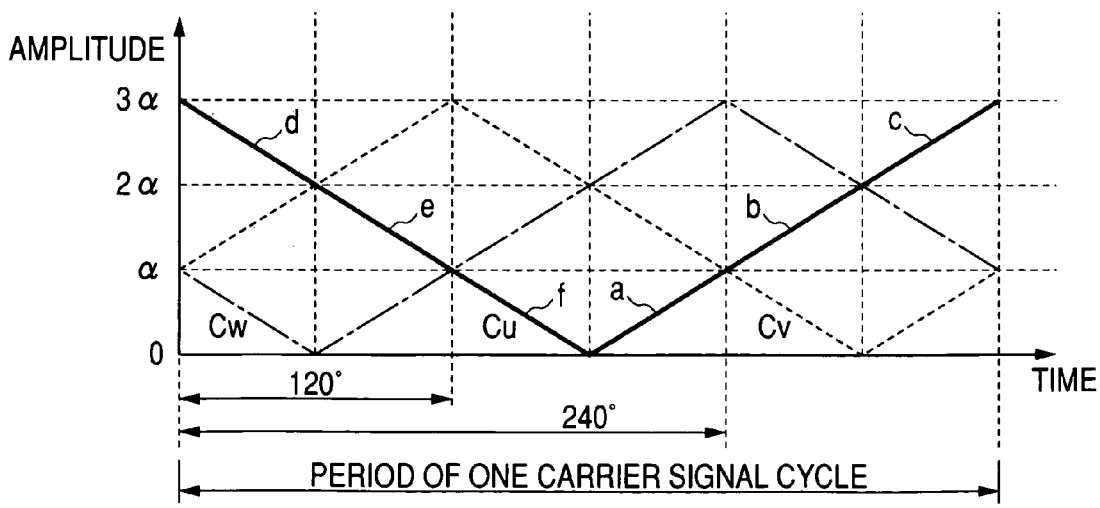

In FIG. 16B, the U-phase carrier signal Cu (the reference triangular wave carrier signal) is caused to arise in the valley (the lower limit value 0). However, as shown in FIG. 16C, the U-phase carrier signal Cu may be caused to arise in the peak (the peak value of $3\alpha$). To this end, the only requirement is that the first selector 141 should select the waveform element "d" ($3\alpha$–X) in the unit period (1) and select the waveform elements "e," "f," "a," "b," and "c" in the unit periods (2) to (6) provided below. In this case, the second selector 142 selects the waveform element "b" (X+a) in the unit period (1) in connection with the V-phase carrier signal Cv. In the unit periods (2) to (6) provided below, the waveform elements "c," "d," "e," "f," and "a," thereby providing the V-phase carrier signal Cv which is out of phase with the U-phase carrier signal Cu that is the reference triangular wave carrier signal by 120°. In connection with the W-phase carrier signal Cw, the third selector 143 selects the waveform element "f" ($\alpha$–X) in the unit period (1). In the unit periods (2) to (6) provided below, the waveform elements "a," "b," "c," "d," and "e" are selected, thereby providing the W-phase carrier signal Cw which is out of phase with the U-phase carrier signal Cu that is the reference triangular wave carrier signal by 240°.

As mentioned above, the waveform elements "a" to "f" for the carrier signals are generated from the reference wave signal K developing on a per-unit-period basis, by means of arithmetic operation. Further, different waveform elements are selected for the respective phases in the respective unit periods (1) to (6). As a result, the three-phase carrier signals Cu, Cv, and Cw having a predetermined phase difference can be readily generated. Therefore, multi-phase carrier signals having a phase difference from the accurate waveform corresponding to the count value of the counter can be obtained without involvement of complicated waveform processing, by means of only subjecting one reference wave signal K to digital arithmetic operation.

Figure 17:
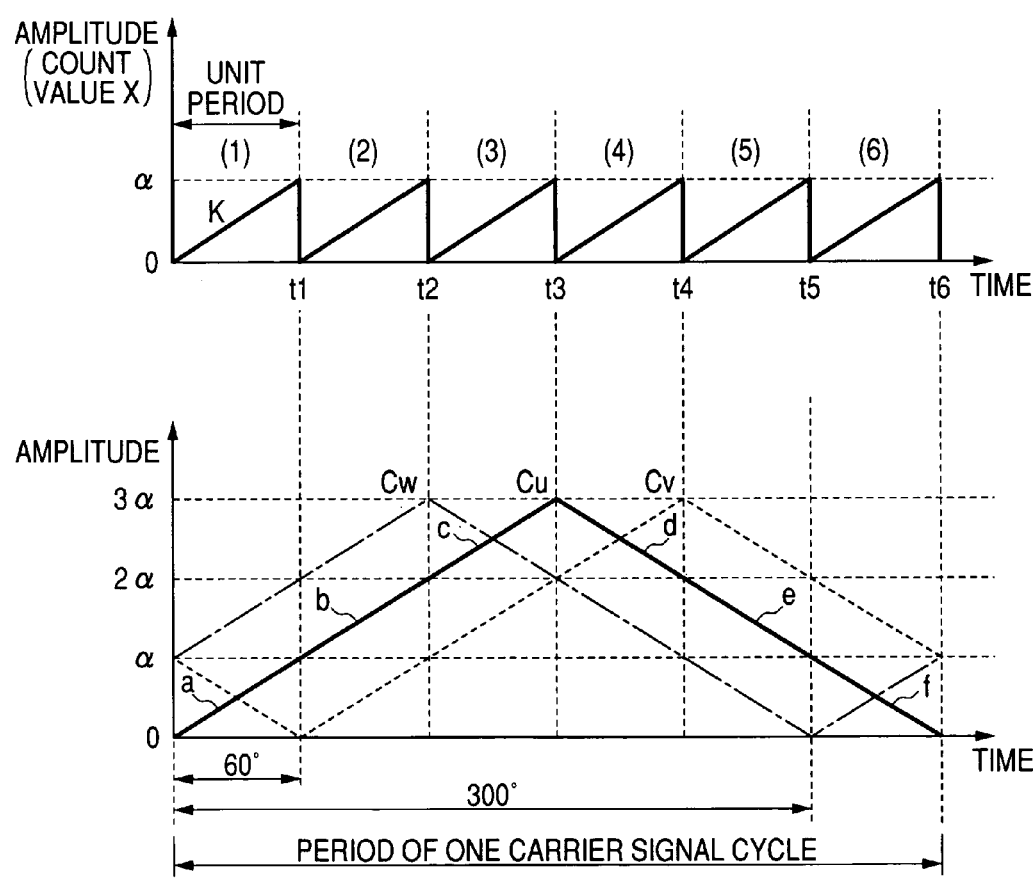
FIG. 17 is a view for describing a principle for generating multi-phase carrier signals.

In the second embodiment, the carrier signals Cu, Cv, and Cw are made out of phase with each other by 120°. However, carrier signals having a phase difference other than 120° can also be formed by changing the waveform elements to be selected during each unit period. For instance, as shown in FIG. 17, so long as the second selector 142 selects the waveform element "f" as the waveform element of the V-phase carrier signal Cv in the unit period (1) and selects the waveform elements "a" to "e" in the subsequent unit periods (2) to (6), the V-phase carrier signal Cv which is out of phase with the U-phase carrier signal Cu by 60° is obtained. Moreover, so long as the third selector 143 selects the waveform element "b" as the waveform element of the W-phase carrier signal Cw in the unit period (1) and selects the waveform elements "c" to "f" and "a" in the subsequent unit periods (2) to (6), the W-phase carrier signal Cw which is out of phase with the U-phase carrier signal Cu by 300° is obtained.

In the second embodiment, the peak values of the respective carrier signals Cu, Cv and Cw are made triple the peak value $\alpha$ of the reference wave. However, the peak values may be made an integral multiple of the peak value of the reference wave, such as a double value or a quadruple value. In the second embodiment, the period of one cycle of the carrier signal is divided into six parts, to thus make six unit periods. However, the number of parts into which the period of one cycle is to be divided is not limited to six. The number may assume another value, such as four or eight. Moreover, the second embodiment takes, as an example, a case where the three-phase carrier signals are generated. However, the present invention can also be applied to a case where two-phase, four-phase, five-phase, and six-phase carrier signals are generated.

The interrupt signal will now be described. As mentioned previously, the interrupt signal generation section 150 (FIG. 14) generates six types of interrupt signals INT1U to INT2W. These interrupt signals are generated at the final timings of the unit period (t1 to t6 in FIG. 16) in accordance with the period rank signal output from the second counter 120. The timings correspond to the peaks and valleys of the triangular wave carrier signals.

An interrupt in the peaks and valleys of the triangular wave carrier signals have already been described by reference to FIG. 5 in the first embodiment, and hence its explanation is omitted.

In the second embodiment, the command value to be compared with the carrier signal is a voltage. However, the command voltage may be an electric current. In the second embodiment, the interrupt signal is caused at both the timing of the peak of the triangular wave carrier signal and the timing of the valley of the same. However, the interrupt signal may be caused at only a timing of either of the two timings. Moreover, the second embodiment has taken as an example the motor controller to which the present invention is applied. However, the present invention can also be applied to various types of controllers other than the motor controller.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multi-phase carrier signal generator for generating multi-phase triangular wave carrier signals comprising:
   a clock generation means which generates a clock signal of predetermined frequency; and
   carrier signal generation sections for respective phases, each section generating a single triangular wave carrier signal, wherein
   each of the carrier signal generation sections comprises:
   a counting means which counts the number of clock signals generated by the clock generation means and subjects a count value to cumulative addition or cumulative subtraction, to thus output a triangular wave carrier signal;
   a first detection means which detects that a count value of the counting means has reached a predetermined upper limit value;
   a second detection means which detects that a count value of the counting means has reached a predetermined lower limit value; and
   a command means which issues to the counting method a subtraction command for effecting the cumulative subtraction on the basis of a detection output from the first detection means and which issues to the counting means an addition command for effecting cumulative addition on the basis of a detection output from the second detection means; and the counting means of one phase outputs a triangular wave carrier signal having a predetermined phase difference from a triangular wave carrier signal output from the counting means of another phase.

2. The multi-phase carrier signal generator according to claim 1, wherein the upper limit value detected by the first detection means and the lower limit value detected by the second detection means are set to the same values for all phases;

an initial value corresponding to the phase difference is set for each counting means of the respective carrier signal generation sections; and the counting means cumulatively adds a count value to the initial value or cumulatively subtracts a count value from the initial value.

3. The multi-phase carrier signal generator according to claim 1, wherein after having issued an initial subtraction or addition command to the counting means, the command means issues the subtraction command to the counting means on the basis of a detection output from the first detection means and issues the addition command to the counting means on the basis of a detection output from the second detection means.

4. The multi-phase carrier signal generator according to claim 1, further comprising a control means which controls operations of the respective carrier signal generation sections; wherein the control means is arranged to simultaneously issue to the respective counting means a count start signal for starting counting of the number of the clock signals; and the respective counting means simultaneously start counting operations upon receipt of the count start signal.

5. A multi-phase carrier signal generation method for generating multi-phase triangular wave carrier signals on the basis of counting of a clock signal of predetermined frequency, the means comprising steps of:

cumulatively adding a count value for each phase until a clock count value reaches a predetermined upper limit value;

cumulatively subtracting a count value until the count value reaches a predetermined lower limit value when the clock count value has reached the predetermined upper limit value;

cumulatively adding the count value again when the clock count value has reached the predetermined lower limit value; and outputting a triangular wave carrier signal having a predetermined phase difference from a triangular wave carrier signal of another phase by repeating the cumulative addition and subtraction.

6. The multi-phase carrier signal generation method according to claim 5, wherein the upper limit value and the lower limit value are set to the same values for all phases, and a predetermined initial value set in accordance with the phase difference is subjected to cumulative addition or cumulative subtraction.

7. The multi-phase carrier signal generation method according to claim 5, wherein counting of the clock is simultaneously started for the respective phases.

8. A carrier signal generator for generating multi-phase triangular wave carrier signals, comprising:

a reference wave generation means which generates at a predetermined period a reference wave formed from a sawtooth wave;

a waveform element generation means which generates, on the basis of the reference wave formed by the reference wave generation means, 2N different waveform elements which are formed from N continuous waveform elements forming an ascending part of the triangular wave carrier signal and N continuous waveform elements forming a descending part of the triangular wave carrier signal;

N is a positive integer; and a selection means which is provided for each phase and which outputs a triangular waveform carrier signal formed from 2N waveform elements in one cycle period by selecting one by one a waveform element generated by the waveform element generation means; wherein the selection means of respective phases respectively select different initial waveform elements, so that selection means of one phase outputs a triangular wave carrier signal having a predetermined phase difference from a triangular wave carrier signal output from selection means of another phase.

9. The multi-phase carrier signal generator according to claim 8, wherein the reference wave generation means comprises:

a clock generation means which generates a clock signal of predetermined frequency;

a first counting means which generates the reference wave by counting the number of a clock signal generated by the clock generation means up to a peak value; and a first detection means which detects that the count value of the first counting means has reached the peak value and outputs a first detection signal for resetting the count value of the first counting means to 0, wherein the first counting means generates 2N reference waves over one cycle period of the triangular wave carrier signal.

10. The multi-phase carrier signal generator according to claim 8, further comprising:

a second counting means which counts the number of times the reference wave is generated by the reference wave generation means; and a second detection means which outputs a second detection signal for resetting a count value of the second counting means to 0 upon detection of the count value of the second counting means having reached 2N, wherein the selection means of respective phases select waveform elements generated by the waveform element generation means in a predetermined sequence on the basis of a count value of the second counting means.

11. The multi-phase carrier signal generator according to claim 9, wherein the waveform element generation means comprises:

a first computing means which generates, on condition that a count value of the first counting means is taken as X and the peak value is taken as $\alpha$, a $P^{th}$ waveform element forming the ascending part among 2N continuous waveform elements forming the triangular waveform carrier signal through computation of $X+(P-1)\cdot\alpha$; and a second computing means which generates a $Q^{th}$ waveform element forming the descending part among continuous 2N waveform elements forming the triangular waveform carrier signal through computation of $(2N+1-Q)\cdot\alpha-X$;

P is an integer from 1 to N; and

Q is an integer from N+1 to 2N, wherein the selection means of respective phases sequentially selects a waveform element generated by the first computing method from first to $N^{th}$ waveform elements after having selected the $2N^{th}$ waveform element forming the descending part and sequentially selects a waveform element generated by the second computing means from $N+1^{th}$ to $2N^{th}$ waveform elements after having selected the $N^{th}$ waveform element forming the ascending part.

12. A carrier signal generation method for generating multi-phase triangular wave carrier signal, comprising steps of:

generating a reference wave from a sawtooth wave at a predetermined cycle;

generating, on the basis of the generated reference wave, 2N different waveform elements formed from N continuous waveform elements forming an ascending part of the triangular wave carrier signal and N continuous waveform elements forming a descending part of the triangular wave carrier signal; and outputting a triangular wave carrier signal whose one cycle period is formed from 2N waveform elements by selecting the waveform elements one by one in a predetermined sequence and outputting a triangular wave carrier signal of one phase with a predetermined phase difference from a triangular wave carrier signal of another phase by selecting a difference waveform element in each phase at the outset.

13. The multi-phase carrier signal generation method according to claim 12, wherein a clock signal of predetermined frequency is generated;

the reference wave is generated by counting generated clock signals to a peak value thereof; and a clock count value is reset to 0 when the clock count value reaches the peak value.

14. The multi-phase carrier signal generation method according to claim 12, wherein the number of times the reference waves are generated is counted;

the waveform elements are selected in a predetermined sequence on the basis of the reference wave count value; and the reference wave count value is reset to 0 when the reference count value reaches 2N.

15. The multi-phase carrier signal generation method according to claim 13, wherein on condition that a count value of the first counting method is taken as X and the peak value is taken as $\alpha$, a $P^{th}$ waveform element forming the ascending part among 2N continuous waveform elements forming the triangular waveform carrier signal is computed through computation of $X+(P-1)\cdot\alpha$, a $Q^{th}$ waveform element forming the descending part among 2N continuous waveform elements forming the triangular waveform carrier signal is computed through computation of $(2N+1-Q)\alpha-X$, P is an integer from 1 to N, Q is an integer from N+1 to 2N, and after the $2N^{th}$ waveform element forming the descending part has been selected for respective phases, waveform elements forming the ascending part are selected sequentially from first to $N^{th}$, and, after the $N^{th}$ waveform elements forming the ascending part have been selected, waveform elements forming the descending part are selected sequentially from $N+1^{th}$ to $2N^{th}$.

* * * * *